(12) United States Patent
Gallegos

(10) Patent No.: US 10,115,317 B2
(45) Date of Patent: Oct. 30, 2018

(54) READING DEVICE THROUGH EXTRA-DIMENSIONAL PERCEPTION

(71) Applicant: Juan M. Gallegos, Oakton, VA (US)

(72) Inventor: Juan M. Gallegos, Oakton, VA (US)

( * ) Notice: Subject to any disclaimer, the term of this patent is extended or adjusted under 35 U.S.C. 154(b) by 415 days.

(21) Appl. No.: 14/961,053

(22) Filed: Dec. 7, 2015

(65) Prior Publication Data

US 2017/0162071 A1    Jun. 8, 2017

(51) Int. Cl.
| | | |
|---|---|---|
| *G09B 17/04* | (2006.01) | |
| *G06F 3/0484* | (2013.01) | |
| *G09B 17/00* | (2006.01) | |
| *G06F 9/44* | (2018.01) | |
| *G06F 17/28* | (2006.01) | |
| *G06F 3/0482* | (2013.01) | |
| *G06F 3/0481* | (2013.01) | |
| *G06F 9/451* | (2018.01) | |
| *G06F 8/38* | (2018.01) | |
| *G06F 3/0483* | (2013.01) | |

(52) U.S. Cl.
CPC ........... *G09B 17/04* (2013.01); *G06F 3/0482* (2013.01); *G06F 3/0483* (2013.01); *G06F 3/04817* (2013.01); *G06F 8/38* (2013.01); *G06F 9/451* (2018.02); *G06F 9/453* (2018.02); *G09B 17/003* (2013.01)

(58) Field of Classification Search
CPC ... G09B 17/003; G09B 17/04; G06F 3/04815; G06F 3/0482; G06F 3/04847; G06F 8/38; G06F 9/4443; G06F 9/4446; G06F 9/451; G06F 9/453
See application file for complete search history.

(56) References Cited

U.S. PATENT DOCUMENTS

| | | |
|---|---|---|
| 1,706,550 A | 3/1929 | Stader |
| 2,162,766 A | 6/1939 | Taylor |
| 2,758,393 A | 8/1956 | Levy |
| 2,996,812 A | 8/1961 | Hamilton |
| 3,148,459 A | 9/1964 | Laurie |
| 3,311,998 A | 4/1967 | Macomber |
| 3,616,549 A | 11/1971 | Warren |
| 3,837,097 A | 9/1974 | Dymond |
| 5,215,466 A | 6/1993 | Rubio |
| 5,600,778 A * | 2/1997 | Swanson ................. G06F 3/033 715/762 |
| 6,056,551 A | 5/2000 | Marasco |
| (Continued) | | |

*Primary Examiner* — Eddy Saint-Vil
(74) *Attorney, Agent, or Firm* — Louis Ventre, Jr.

(57) ABSTRACT

An apparatus is used to add dimensionality to material to be viewed or listened to by a user. While reading material is typically shown to a user in two dimensions, the apparatus displays the reading material with added-dimensionality on a screen of a computing device. The process implemented on the apparatus involves adding the material in the form of units to the memory device; displaying each unit on a computer screen in an ordered scheme incorporating motion of each unit according to a control theme; and forming a guide on the screen to focus user attention on a unit or set of units. The guide has a characteristic choosable by the user. The apparatus can convert the material to another language and allow the user to control the display. A network connection enables remote control of the process and supplementation of the material for implementation by the process.

9 Claims, 30 Drawing Sheets

(56) References Cited

U.S. PATENT DOCUMENTS

| | | | |
|---|---|---|---|
| 6,067,069 A | 5/2000 | Krause | |
| 6,409,513 B1 | 6/2002 | Kawamura et al. | |
| 6,726,487 B1 | 4/2004 | Dalstrom | |
| 8,209,623 B2 * | 6/2012 | Barletta | G06F 3/04883 715/776 |
| 2010/0144422 A1 * | 6/2010 | Jackson | G07F 17/3244 463/20 |
| 2014/0274295 A1 * | 9/2014 | Poole | G07F 17/34 463/20 |
| 2015/0004586 A1 * | 1/2015 | Tomson | G09B 5/06 434/322 |

\* cited by examiner

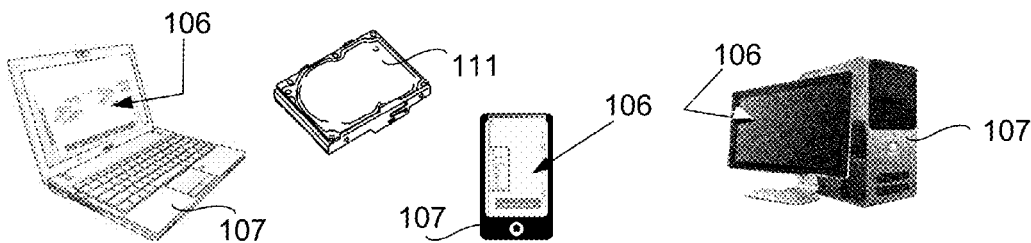

| Apparatus: An apparatus for adding dimensionality to material otherwise typically shown in two dimensions and displaying added-dimensionality on a screen of a computing device operated by a user for a purpose of improving speed and area of perception in human comprehension of the material      105 |
|---|
| Memory: a non-transitory computer-readable medium having stored thereon a set of instructions that when executed causes the computing device to implement a process of manipulating the material from two-dimensional format to create and display added-dimensionality material on the screen of the computing device      110 |
| Adding Step: adding the material to the non-transitory computer-readable medium, the material comprising a plurality of units wherein each unit is selected from the group consisting of a letter, a word, an image, a sound, a video, and an object and a symbol      115 |
| Displaying Step: displaying each unit on the screen of the computing device in an ordered scheme incorporating motion of each unit, the ordered scheme defining a path of movement for each unit      120 |
| Moving Step: moving each unit on the screen according to a control theme, the control theme selected from the group consisting of the speed of motion of one or more units, the acceleration of one or more units, the size of one or more units, the pulsation of one or more units, the rotation of one or more units, the color of one or more units, the shape of one or more units, and the reading direction of one or more units      125 |
| Forming Step: forming a guide on the screen to focus user attention on a unit or set of units, the guide having a characteristic choosable by the user, the characteristic selected from the group consisting of transparency percentage, speed of movement, and shape      130 |

FIG.1

| Language Control: wherein the instructions when executed further causes the computing device to implement a step of converting units to another language 205 |
|---|
| Volume Control: wherein the instructions when executed further causes the computing device to implement a step of offering the user a control to alter the playback speed of a video 210 |
| Frequency Control: wherein the instructions when executed further causes the computing device to implement a step of offering the user a control to alter frequency of a sound 215 |
| Guide Menu: wherein the instructions when executed further causes the computing device to implement a step of offering the user a menu to select the guide 220 |
| Theme Menu: wherein the instructions when executed further causes the computing device to implement a step of offering the user a menu to select the control theme 225 |
| Guide Options Menu: wherein the instructions when executed further causes the computing device to implement a step of offering the user a menu to select the guide from the group consisting of a rectangle, a triangle, a pointer, an ellipse, an object and a symbol 230 |
| Controls Component: controls alterable by the user, the controls selected from the group consisting of: timing of starting and stopping the step involving displaying each unit on the screen, reversing display order, fast-forwarding to a unit that would otherwise be displayed at a later time, rewinding to a previously displayed unit, pausing guide and unit movement, aggregating a plurality of units for display, and activating reporting of one or more display dimensions 235 |
| Network Component: a network connection to the computing device, the network connection enabling remote control of the process and supplementation of the material for implementation by the process 240 |
| Enclosure: requiring the ordered scheme to include maintaining an enclosure around each unit 245 |

FIG.2

READING DEVICE THROUGH EXTRA-DIMENSIONAL PERCEPTION

TECHNICAL FIELD

In the field of education and demonstration, a device relates to reading and instruction in the way words and letters are packaged, arranged and moved past a guided viewing position on a screen so that a user can improve speed of comprehension and expand peripheral vision.

BACKGROUND

For centuries the way of reading has been concentrated on a 2 dimensional space, some cultures exercise this action following established reading patterns like up to down, from left to right, or from right to left. Some exercises have been proposed from different entities to practice a better lecture to increase the speed of reading or to increase the absorption of knowledge in a short period of time. With this invention a further representation is provided to use more dimensions including a combination of resources to catch the attention of our senses, with the reading methods proposed to practice and explore new ways of knowledge acquisition in short periods of time using multidimensional input.

SUMMARY OF INVENTION

An apparatus is used to add dimensionality to material, such as reading material and recorded material, to be viewed or listened to by a user. While reading material is typically shown to a user in two dimensions, the apparatus displays the reading material with added-dimensionality on a screen of a computing device. The apparatus is operated by a user for a purpose of improving speed and area of perception in human comprehension of the material. A physical computer memory device with programming implements a process. The process involves adding the material in the form of units to the memory device; displaying each unit on a computer screen in an ordered scheme incorporating motion of each unit according to a control theme, which may include a container for each unit; and forming a guide on the screen to focus user attention on a unit or set of units. The guide has a characteristic choosable by the user. The apparatus can convert the material to another language and otherwise allow the user to control features of the display. A network connection enables remote control of the process and supplementation of the material for implementation by the process.

Technical Problem

Human perception and comprehension of material presented in two dimensions can be boring, often requiring unnecessarily long periods to achieve true understanding of what is presented.

Solution to Problem

The solution is an apparatus that can present the material with added dimensionalities such as in motion, having variable size or shape, employing guides and enclosures that better focus attention and using schemes that mimic other events in human experience.

Advantageous Effects of Invention

The advantageous use of motion and packaging of presented material can better focus and maintain user attention. Novel presentation of materials with added dimensionality maintains human concentration for longer periods of time so that knowledge transfer can be sped up.

Added dimensionality in material presentation improves user enjoyment in consuming the materials.

BRIEF DESCRIPTION OF DRAWINGS

The drawings illustrate preferred embodiments of the tactical telescoping shotgun according to the disclosure. The reference numbers in the drawings are used consistently throughout. New reference numbers in FIG. 2 are given the 200 series numbers. Similarly, new reference numbers in each succeeding drawing are given a corresponding series number beginning with the figure number.

FIG. 1 is an illustration of apparatus components and a table of steps implemented by the apparatus in a preferred embodiment.

FIG. 2 is a table of steps implemented by the apparatus in alternative embodiments.

DESCRIPTION OF EMBODIMENTS

In the following description, reference is made to the accompanying drawings, which form a part hereof and which illustrate several embodiments of the present invention. The drawings and the preferred embodiments of the invention are presented with the understanding that the present invention is susceptible of embodiments in many different forms and, therefore, other embodiments may be utilized and structural, and operational changes may be made without departing from the scope of the present invention.

FIG. 1 illustrates components and steps in a preferred embodiment. A preferred embodiment is an apparatus (105) for adding dimensionality to material typically displayed or existing in two dimensions. A dimension is an aspect or feature of a moving presentation. The dimension is showable on the screen (106) of a computing device (107). The dimension includes at least one of speed, acceleration, size, pulsation, rotation, movement path, language, color, shape, volume of a sound, frequency of a sound, and reading direction.

Figure 3:
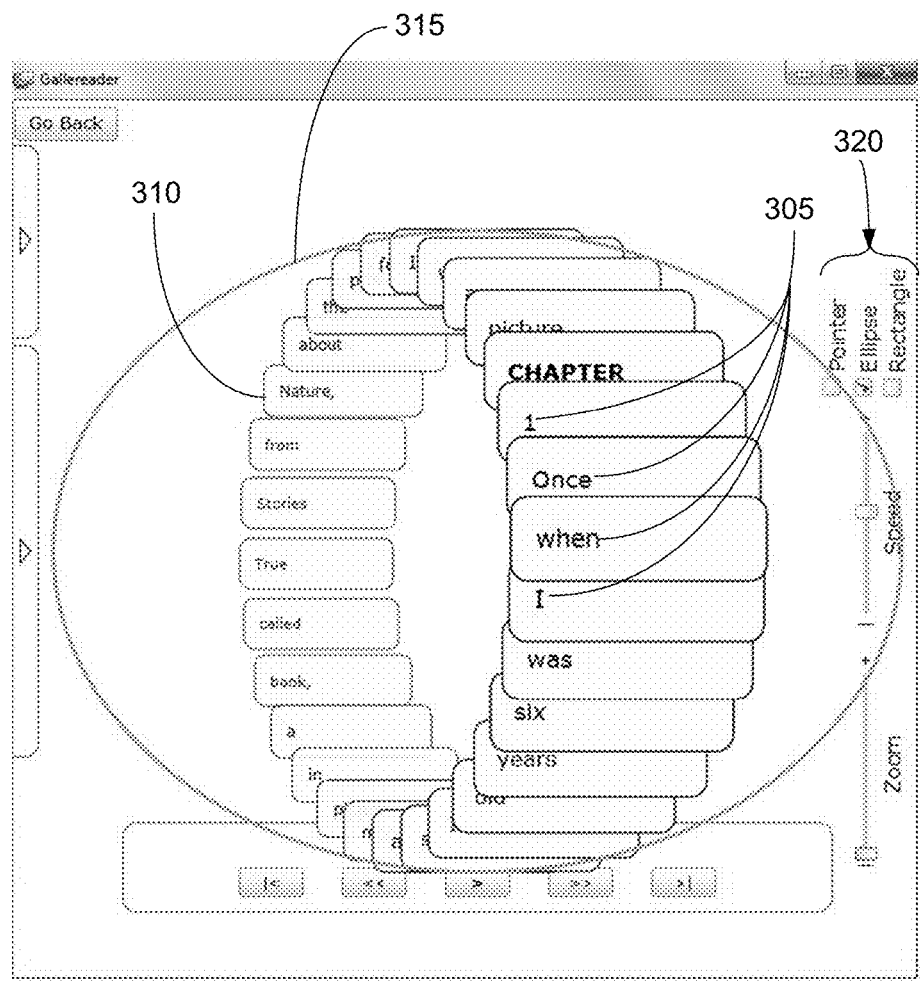
FIG. 3 is a wheel-screen-shot of an ordered scheme used in an embodiment.

The material is composed of a plurality of units, such as for example, each unit (305) shown in FIG. 3 is one word or number taken from a book. The material in a preferred embodiment would be the words of a book.

Any unit (305) in a book may also be a single character, such as for example each letter of every word of the book may be considered a unit (305). The material may include other types of units. Thus, each unit (305) might be any of a letter, a word, an image, a sound, a video, an object, a symbol, or any other unitary element in a larger work.

Most of these units are self-explanatory. There is an intended distinction between an object and a symbol. The object is a data construct that provides a description of something that may be used by a computer such as a processor, a peripheral, a document, or a data set. The object preferably defines its status, its method of operation, and how it interacts with other objects. In contrast, a symbol is a thing that represents or stands for something else, especially a material object representing something abstract, such as for example a construct signifying a warning, a logo, a stamp, a brand, etc.

Thus, this preferred embodiment is also an apparatus (105) for displaying added-dimensionality on the screen (106) of a computing device (107) operated by a user. The purpose of the apparatus (105) and the added dimensions is to improve a user's reading speed and enlarge the user's area of perception as an aid in human comprehension of the material.

The apparatus (105) includes memory (110), which is a non-transitory computer-readable medium (111). The non-transitory computer-readable medium (111) is a tangible medium. Examples include a hard drive, a thumb drive, and such other physical memory that is well known in the art. The non-transitory computer-readable medium (111) is not a transitory propagating signal.

The non-transitory computer-readable medium (111) has stored thereon a set of instructions that when executed causes the computing device (107) to implement a process of manipulating the material from two-dimensional format to create and display added-dimensionality material on the screen (106) of the computing device (107).

The process includes an Adding Step (115); a Displaying Step (120); a Moving Step (125); and a Forming Step (130).

The Adding Step (115) includes adding the material to the non-transitory computer-readable medium (111).

Figure 6:
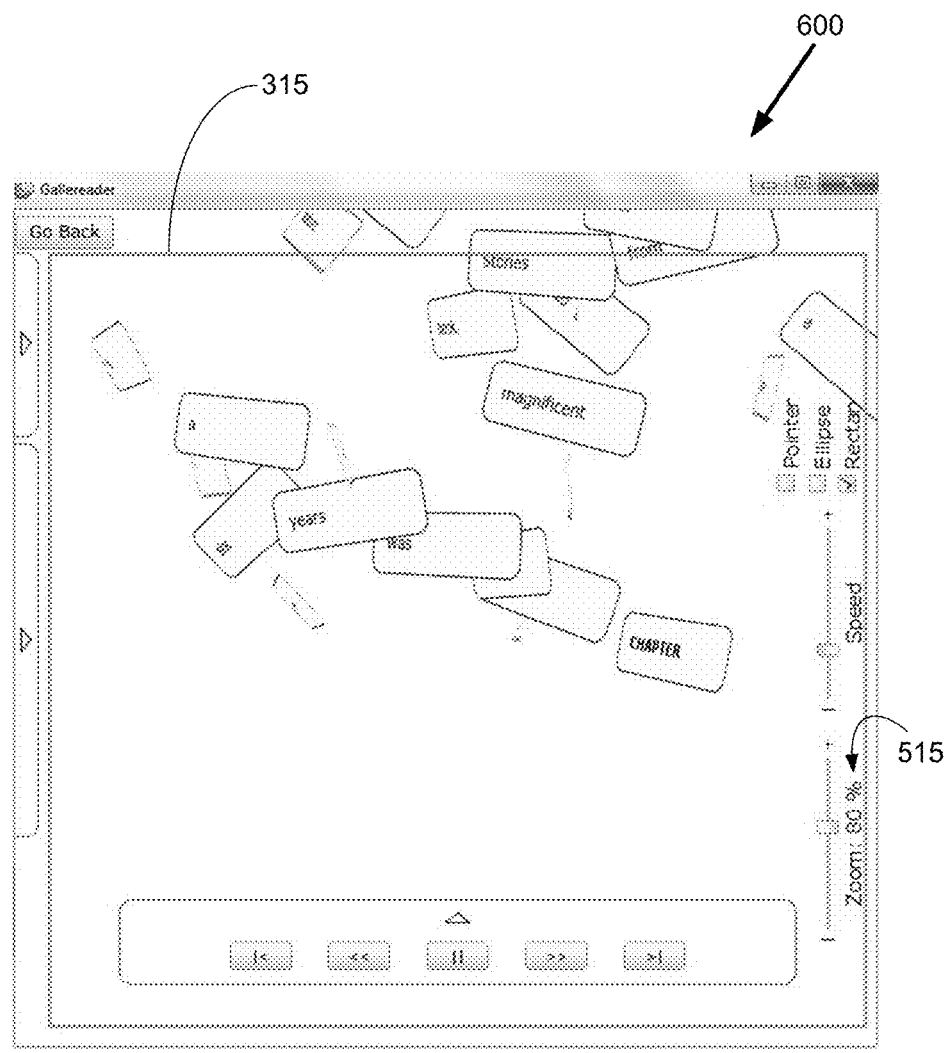
FIG. 6 is an autumn-screen-shot of an ordered scheme used in an embodiment.

The Displaying Step (120) includes displaying each unit (305) on the screen (106) of the computing device (107) in an ordered scheme incorporating motion of each unit (305), the ordered scheme defining a path of movement for each unit. An example is a figures-screen-shot (1200) of FIG. 12 which shows a path (1205) of non-linear movement. The autumn-screen-shot (600) of FIG. 6, shows a second example where the ordered scheme is a falling leaf, where each unit within an enclosure (245), which is a rounded rectangular box, falls from the top of the screen (106) and wafts downward as one might imagine a falling leaf. A third example of an ordered scheme is virtual rotating Ferris wheel, similar to that shown in the wheel-screen-shot (300) of FIG. 3. The ordered scheme may include an enclosure (245) surrounding a unit (305). An illustration of the enclosure around each unit is the rounded rectangular box (310) shown in FIG. 3.

Figure 19:
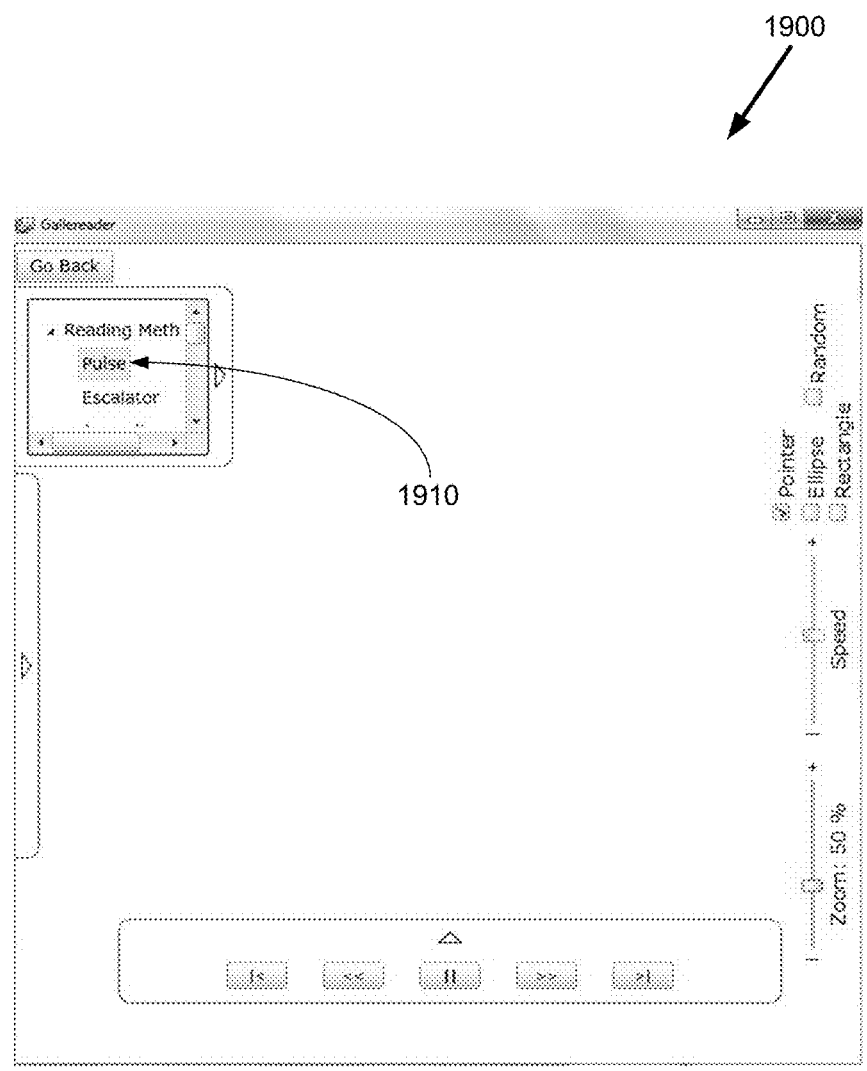
FIG. 19 is a reading-methods-screen-shot showing a menu selection for a variety of reading methods.
Figure 20:
FIG. 20 is a selector-screen-shot showing a menu for language selection.

FIGS. 3-9 and 11-18 and 21-25 show screen shots of different ordered schemes. FIG. 10, FIG. 19, and FIG. 20 illustrate user menus. These ordered schemes are exemplary motion-incorporating displays titled: wheel-screen-shot (300); virtual-screen-shot (400); jumps-screen-shot (500); autumn-screen-shot (600); book-screen-shot (700); accordion-screen-shot (800); columns-screen-shot (900); escalator-screen-shot (1100); figures-screen-shot (1200); hexagons-screen-shot (1300); horizontal-screen-shot (1400); mirror-screen-shot (1500); movie-screen-shot (1600); pulse-screen-shot (1700); pyramids-screen-shot (1800); spaceship-screen-shot (2100); trains-screen-shot (2200); vertical-screen-shot (2300); watermill-screen-shot (2400); and wings-screen-shot (2500).

The wheel-screen-shot (300) of FIG. 3 illustrates a rotating Ferris-wheel-like simulated 3-dimensional (3D) presentation of the material. The apparatus (105) may be used to support a lecture by altering the speed or acceleration of the material. Each unit (305) is presented in a cylindrical motion. Each unit (305) is seemingly moved closer to the user and then farther away from the user. The movement of each unit (305) and a guide (315) is designed to catch the attention of every object or group of units. Controls in the system to regulate the properties like size, speed are shown on the wheel-screen-shot (300).

Figure 4:
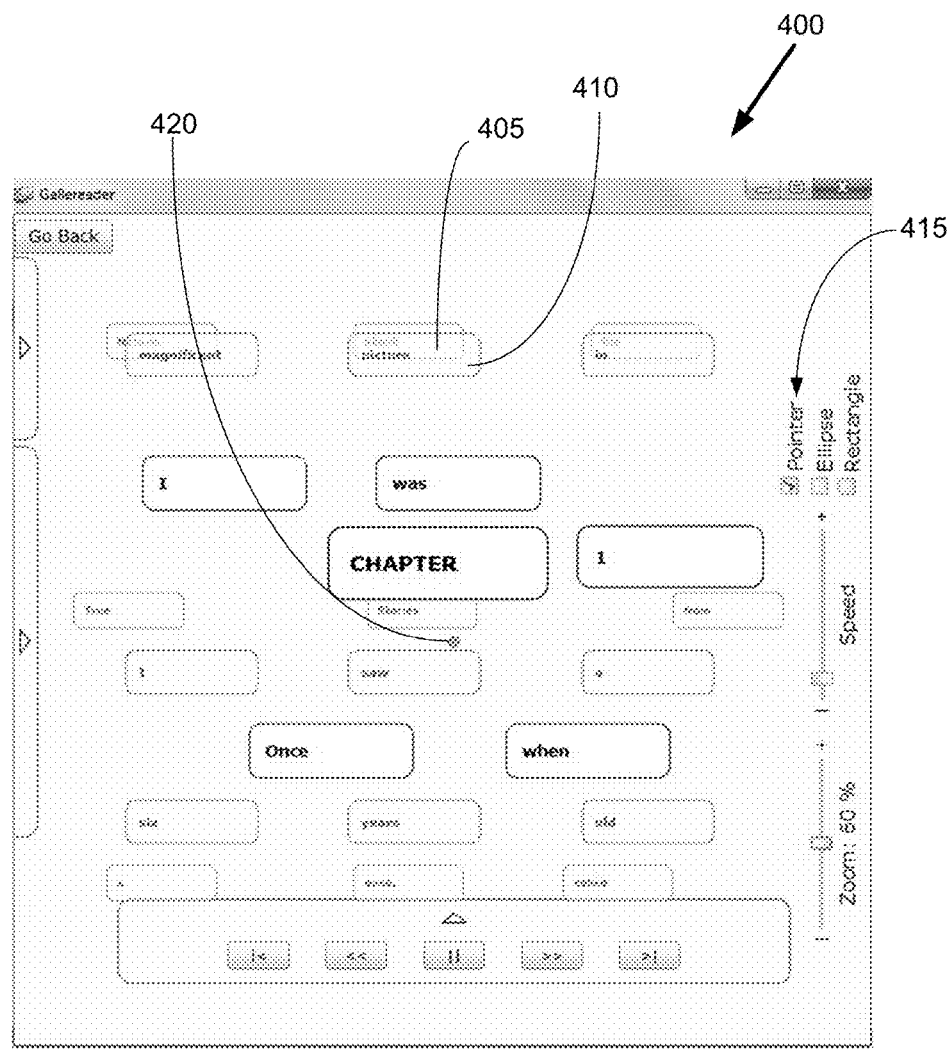
FIG. 4 is a virtual-screen-shot of an ordered scheme used in an embodiment.

The virtual-screen-shot (400) of FIG. 4 illustrates an apparatus (105) where each unit (305) is placed in a 3D environment integrated with a logic to cover all the perspectives, the assembled units behave like they are floating in the space, the control for speed changes the rate of replacement of the units. The independent movement of each unit (305) acts as an attention catcher for the user.

Figure 5:
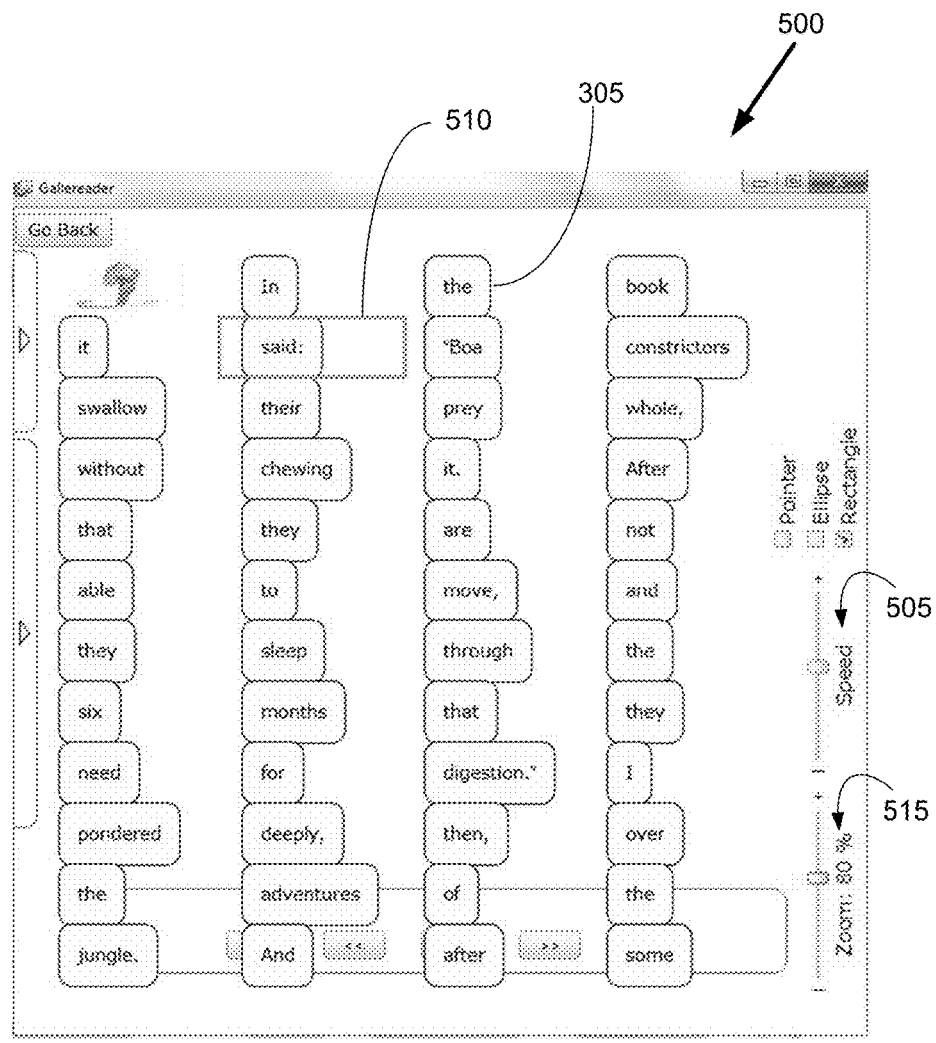
FIG. 5 is a jumps-screen-shot of an ordered scheme used in an embodiment.

The jumps-screen-shot (500) of FIG. 5 illustrates an apparatus (105) where units are moved in a two-dimensional area. The rectangle (510) guide may be used, for example, to influence the order of a lecture and the speed of the lecture. The guide (315) may be selected having a different shape or color to alter a user's sense of space, speed of reading, concentration, and exercise a user's eye muscles. Preferably, the guide (315) is also in motion and travels backwards or forward, up or down depending upon either a user selection and/or a default setting in the apparatus (105) behavior to accomplish the lecture. This operability may be enhanced by controls enabling display of the units starting from the end or reading backwards at one or more reverse speeds. FIG. 5 provides exemplary illustration of a control for changing the speed of motion of each unit using the speed control (505) slider bar. FIG. 5 is also an exemplary illustration of a control for the acceleration of one or more units and an exemplary illustration of a control for the size of one or more units using the zoom control (515) slider bar. FIG. 5 is also an exemplary illustration of transparent containers holding the units shown in the overlay of the second unit (405) over the first unit (410).

The autumn-screen-shot (600) of FIG. 6 illustrates an apparatus (105) where a unit (305) is displayed following a random pattern. The units rotate or move in any 3-dimensional direction: up, down, left, right, into the screen (106) simulated by a reducing size, and out of the screen simulated by increasing size. The speed and/or acceleration applied to the each unit (305) moves the unit (305) to new positions on the screen until a group or set of units reaches the end of the visible area on the screen (106). An independent movement of each unit (305) is what catches the attention of the user. The guide (315) focuses the area of vision. The speed of the unit (305) affects translation of the unit (305) across the screen (106). The zoom control (515) enables a user to enlarge the unit (305) simulating an approaching unit (305).

Figure 7:
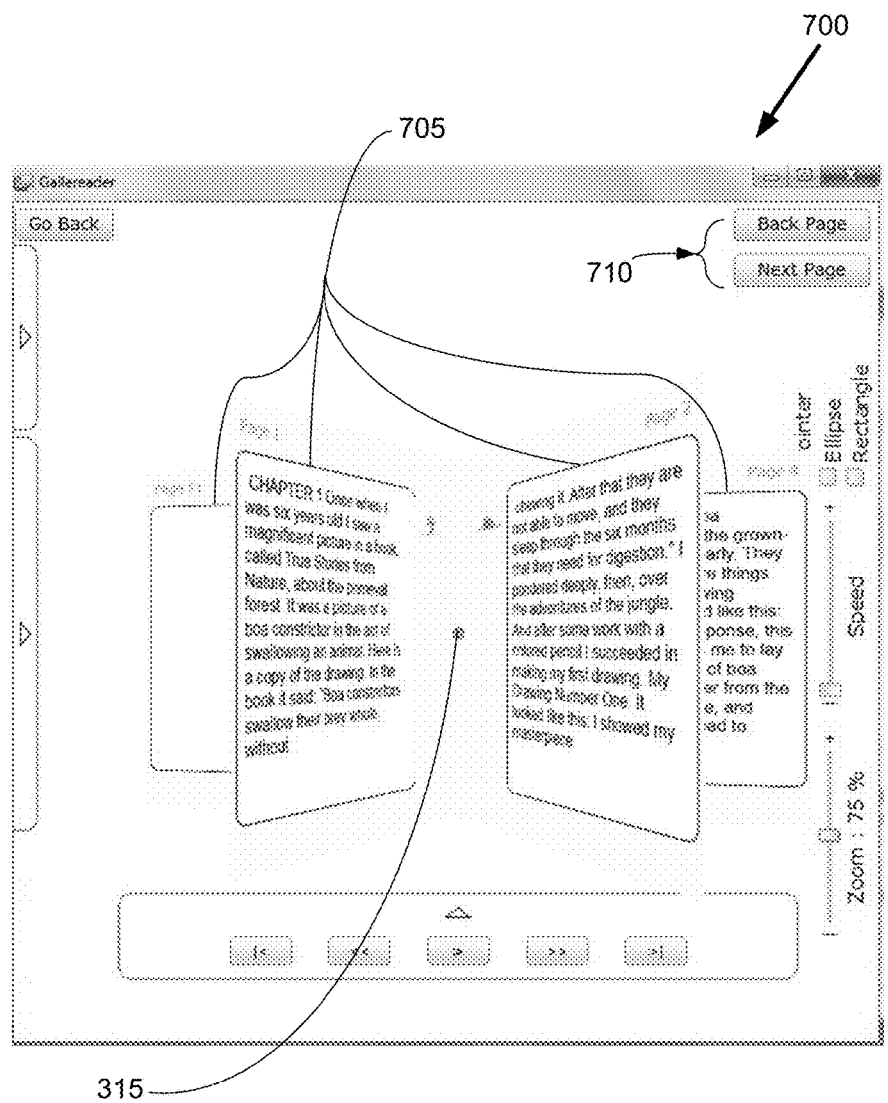
FIG. 7 is a book-screen-shot of an ordered scheme used in an embodiment.

The book-screen-shot (700) of FIG. 7 illustrates an apparatus (105) employing 4-dimensional book reading, where a set of planes (705), four planes in this example, simulate sheets in a physical book. The set of planes (705) contain units being displayed and the guide (315) is selected or chosen either by default or by user action. The set of planes (705) rotate in simulated angular motion showing in perspective the units in a simulated 3-dimensional structure. The structure helps to show more units per area of vision. The user may activate other features such as zooming before or after selection of certain areas of interests. The speed control (505) slide bar alters the refresh rate of new units and controls for rotation may be activated with time synchronization by a default setting of the apparatus (105) or by action of the user interaction with the page controls (710) provided on the upper right corner. Each plane may include units using other dimensions repeating the pattern or reusing the space without restrictions (example a 4D book inside the unit (305), like fractal structures for this and all the methods presented here: This is to say that one unit (305) may contain other units simulating multidimensional structure.

Figure 8:
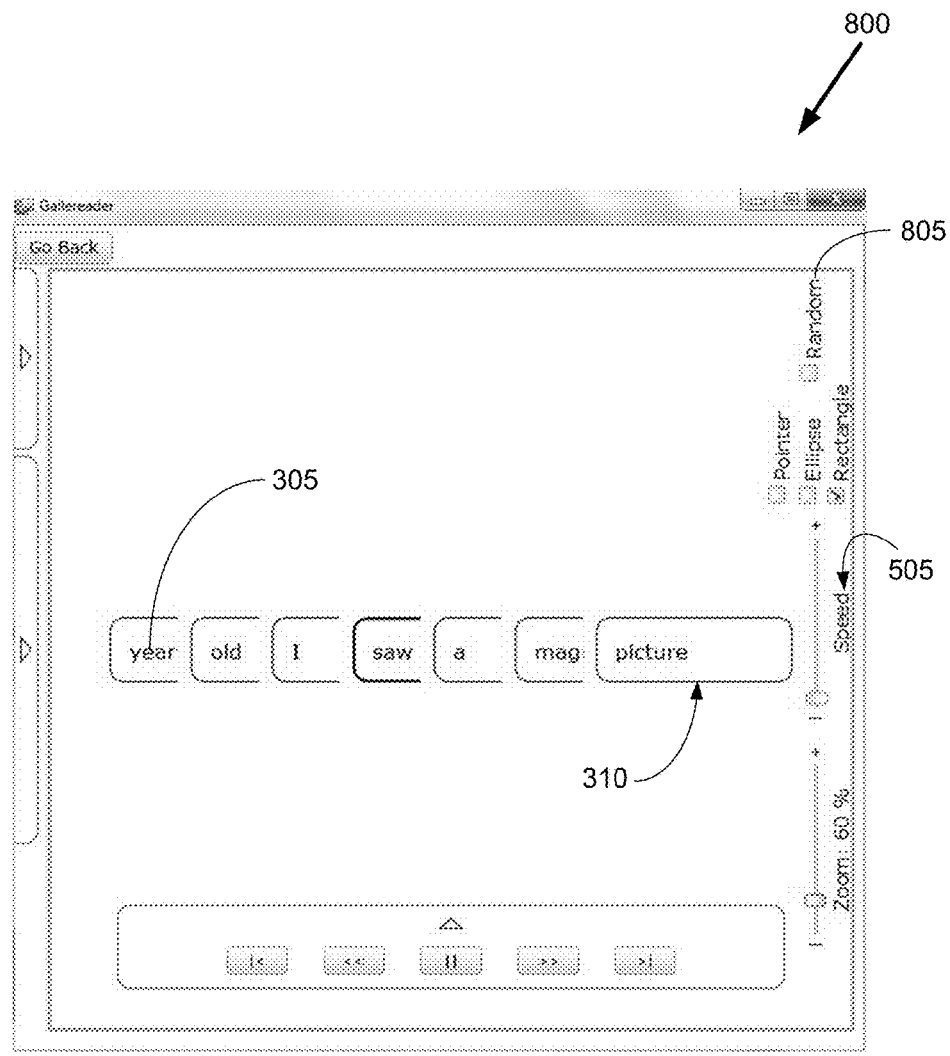
FIG. 8 is an accordion-screen-shot of an ordered scheme used in an embodiment.

The accordion-screen-shot (800) of FIG. 8 illustrates an apparatus (105) where a unit (305) is an enclosure or container that is a rounded rectangular box (310). The group of elements behave by opening and shrinking in a horizontal direction. The speed control (505) slider bar preferably changes the set of elements. The apparatus (105) or the user may change attributes like colors, guides, sizes, or order of display with the controls preferably provided at the bottom of the screen (106). Also, a check box for "random" (805) enables the guide (315) to randomly alternate during the Displaying Step (120).

Figure 9:
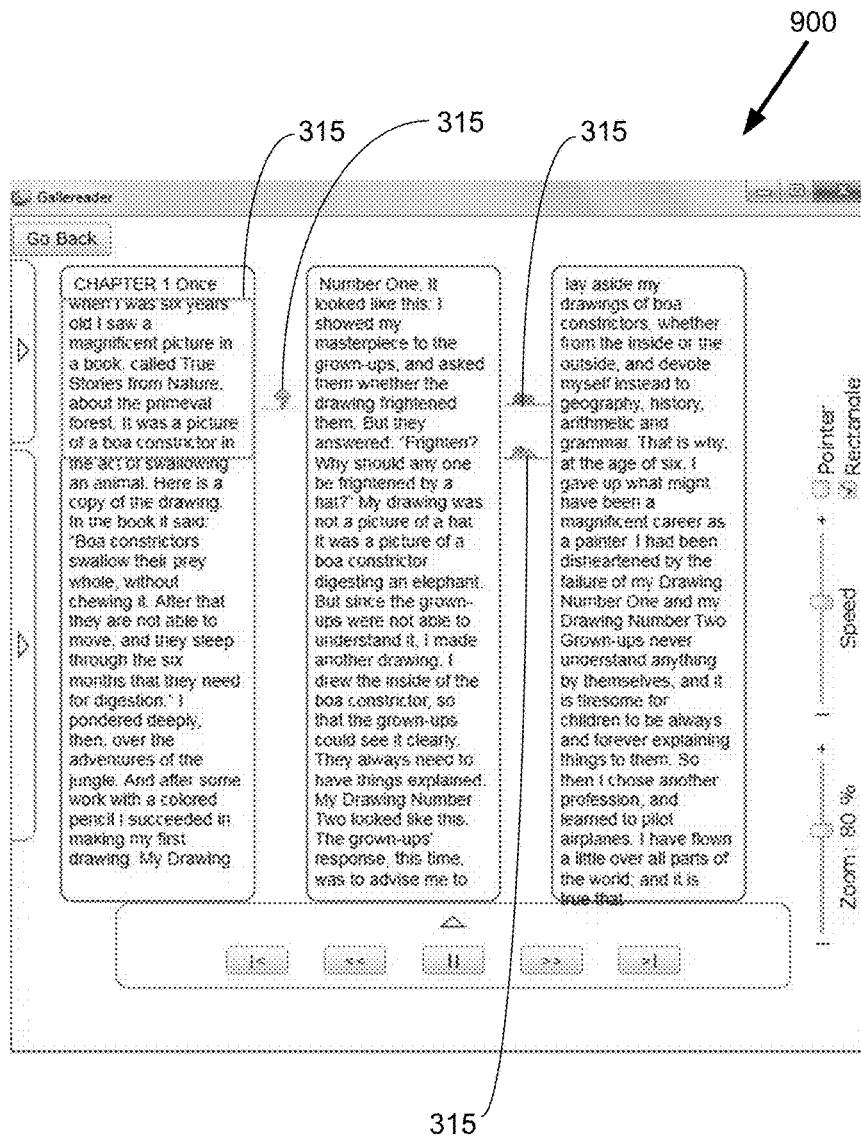
FIG. 9 is a columns-screen-shot of an ordered scheme used in an embodiment.
Figure 10:
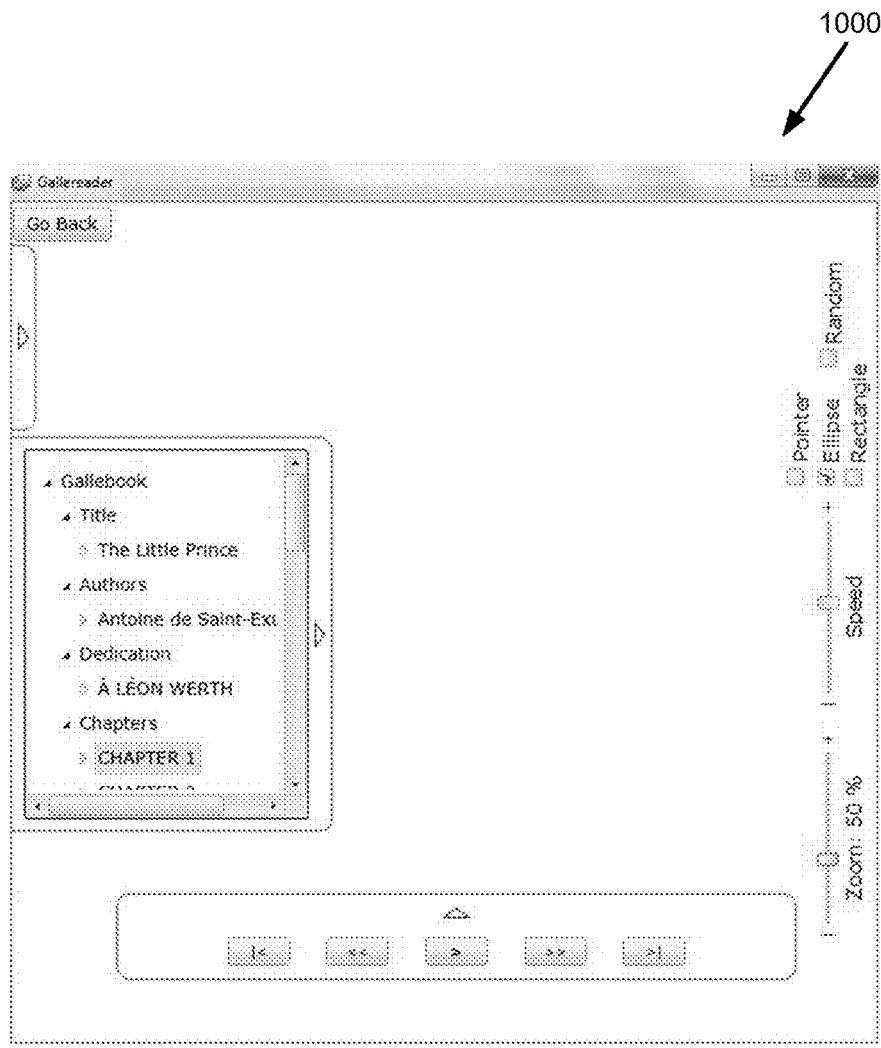
FIG. 10 is a contents-screen-shot showing a menu for selecting a starting point for display.

The columns-screen-shot (900) of FIG. 9 illustrates an apparatus (105) using more than one guide (315) each having motion to catch the attention of users. Such guides may have different shapes, colors, speed, or sizes, for example to cover the areas of a lecture. A preferred guide is one having a geometric shape. The guides may move according to the automatic speed or acceleration activated from the user. The apparatus (105) or the combination of both guides and units may behave differently from the units outside a guide (315) focus so as to filter the required content. Appended units with different formats like images, sounds, videos or other controls may be positioned, for example to follow the sequence of lecture. Such units may be visible with actions from the user to be zoomed or exported to other formats, or may react from a user or system event.

Figure 11:
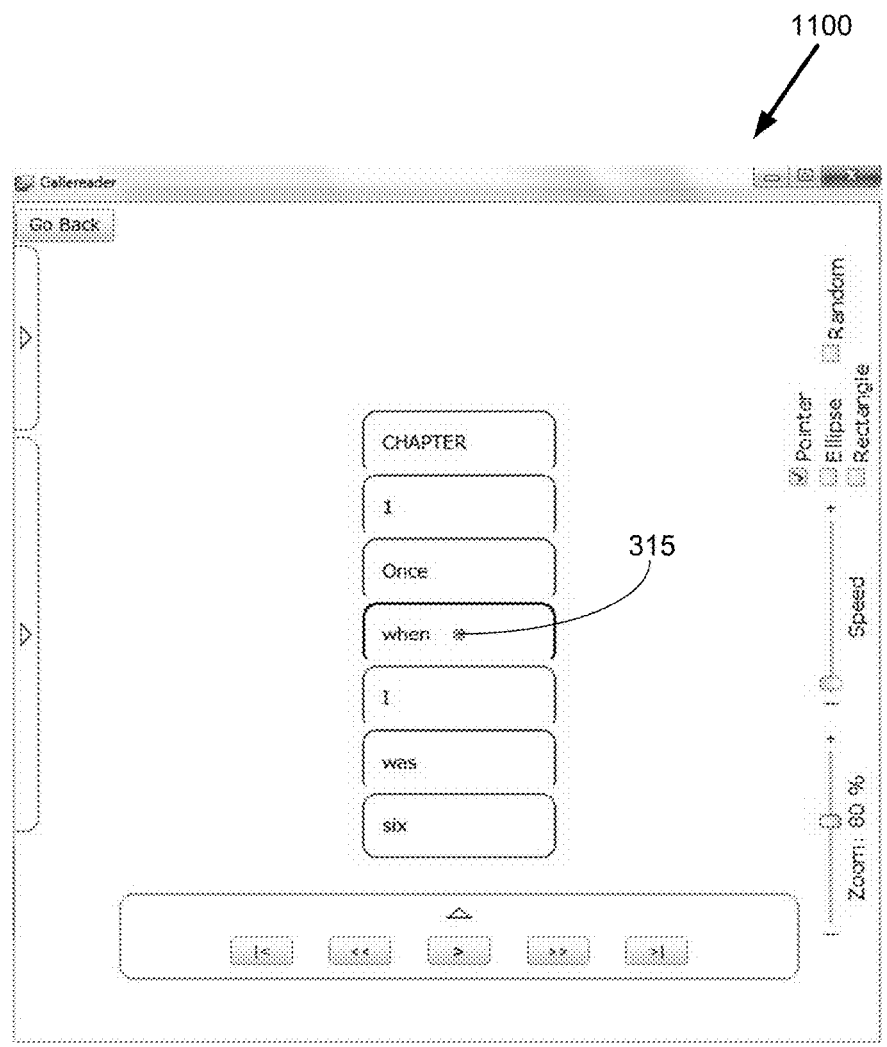
FIG. 11 is an escalator-screen-shot of an ordered scheme used in an embodiment.

The escalator-screen-shot (1100) of FIG. 11 illustrates an apparatus (105) where each unit (305) shrinks from the center in a vertical direction. The speed of display changes a set of units displayed in each cycle. The cycle of display preferably changes with each new set of units. At least one guide (315) is preferably provided to concentrate the user's attention on some areas and/or to capture information using peripheral vision.

Figure 12:
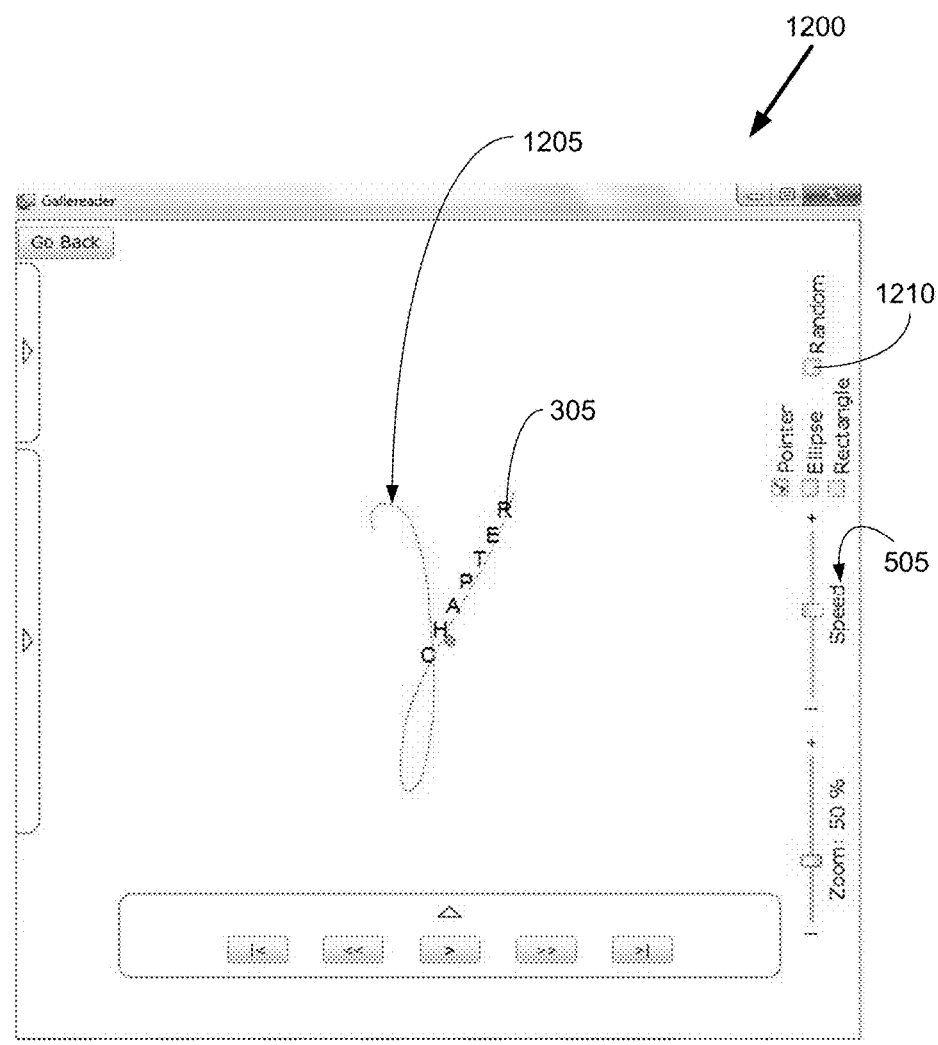
FIG. 12 is a figures-screen-shot of an ordered scheme used in an embodiment.

The figures-screen-shot (1200) of FIG. 12 illustrates an apparatus (105) using different paths or patterns that act as a rail track for each unit (305). The unit (305) moves along the path. The unit (305) may move following the contour of a symbol or structure. The speed control (505) alters the time the element is displayed while in motion. The random (1210) check box, when selected, positions at least one unit (305) out of the center to place it in the peripheral area of vision.

Figure 13:
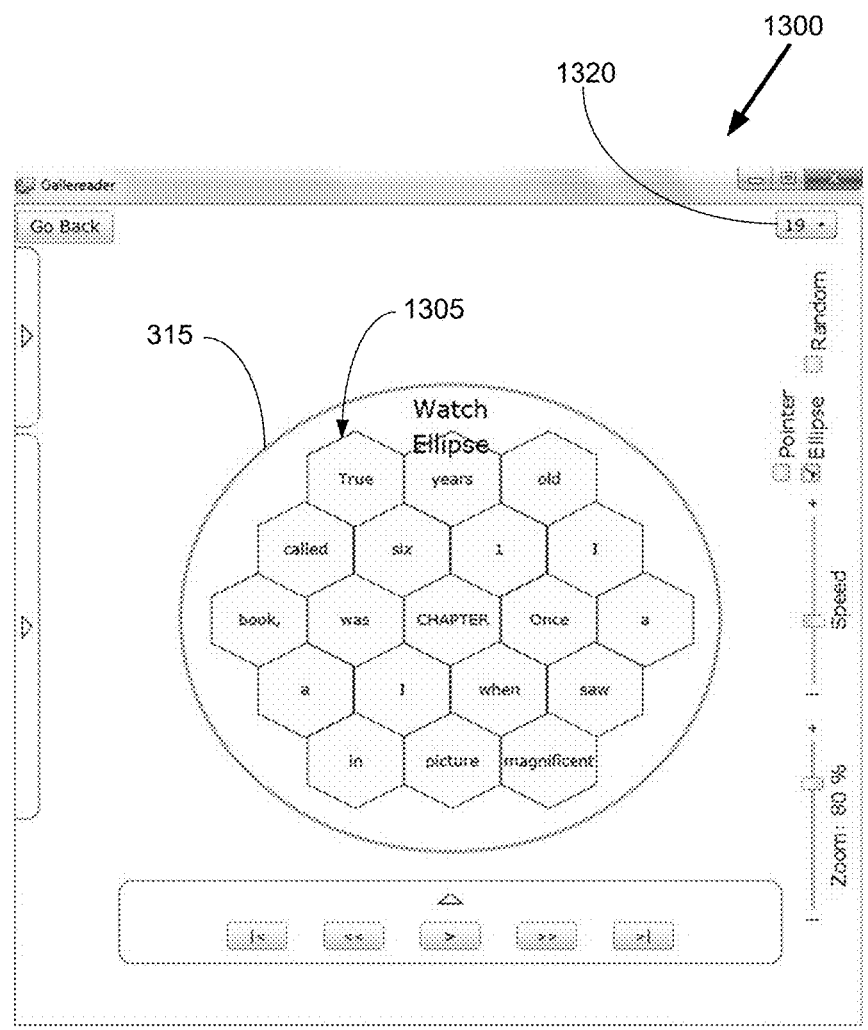
FIG. 13 is a hexagons-screen-shot of an ordered scheme used in an embodiment.

The hexagons-screen-shot (1300) of FIG. 13 illustrates an apparatus (105) using grouping where each unit is in enclosure (245) of a geometric shape, which in this example is a hexagon (1305). Like the guide (315), the enclosure (245) may take on any shape, for example a geometric shape. In this example the guide (315) is an ellipse, referred to as a "watch ellipse" as an instruction to see and concentrate into the area of vision. The watch ellipse surrounds the grouping. The guide (315) offers a way to discover a pattern concentrated in the area of vision, with these hexagons shapes but not limited to this type of structure the user starts to explore different ways to perceive and absorb information using different shapes to reuse the surrounding multidimensional space. A selector (1320) menu enables selection of the number of units per sight (area within the watch ellipse).

Figure 14:
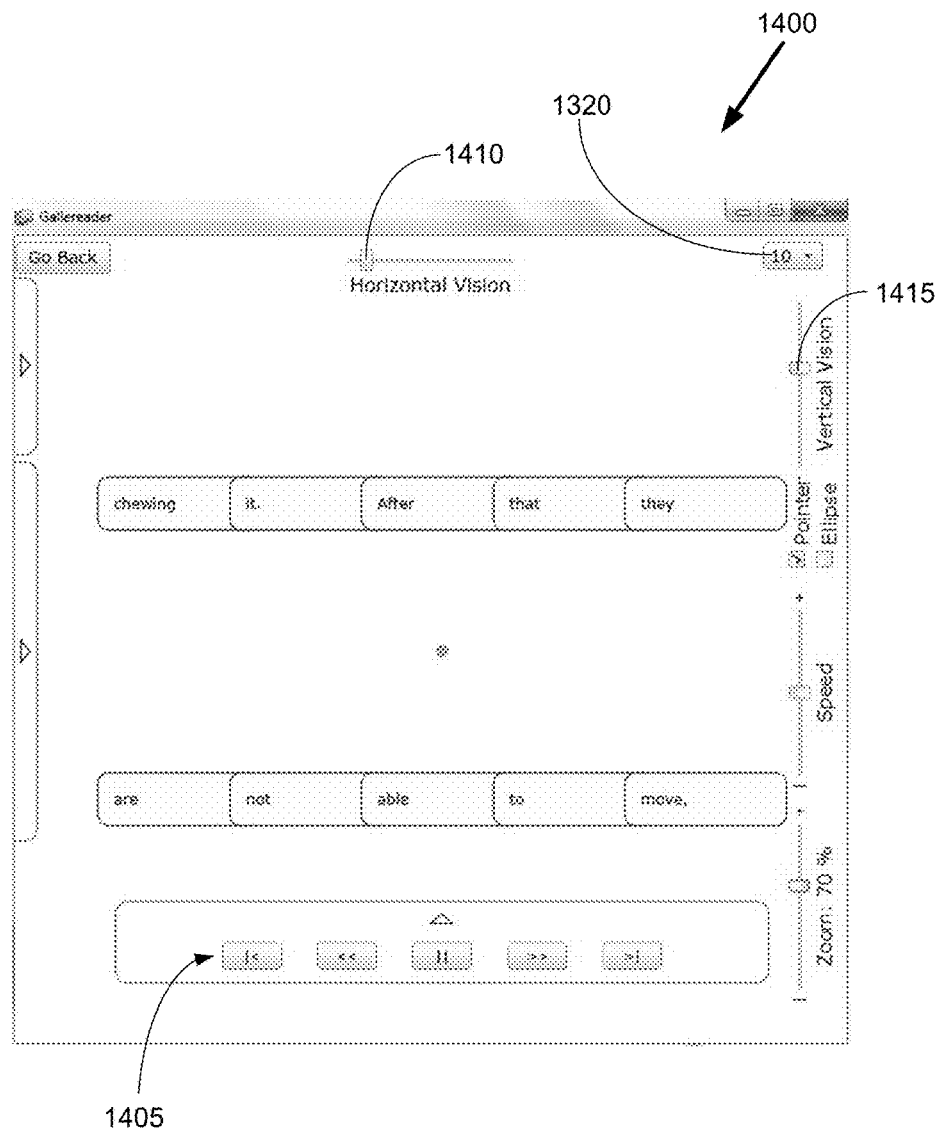
FIG. 14 is a horizontal-screen-shot of an ordered scheme used in an embodiment.

The horizontal-screen-shot (1400) of FIG. 14 illustrates an apparatus (105) that explores a user's horizontal area of vision. The horizontal-slide-bar (1410) controls the distance between units and the vertical-slide-bar (1415) narrows and expands the space between the rows. The selector (1320) enables a choice as to the number of units displayed (in this case 10). The selector (1320) affects overlapping and in combination with other control choices can determine unit twisting or modifying the order of the elements and is either at a default setting or it is manipulated by the user due to the combination of such choices. Preferably, all of the embodiments of the apparatus (105) contain a Controls Component (235) which at least provides controls (1405) of the display shown in the horizontal-screen-shot (1400) of FIG. 14 to start, pause, stop, backward and forward.

Figure 15:
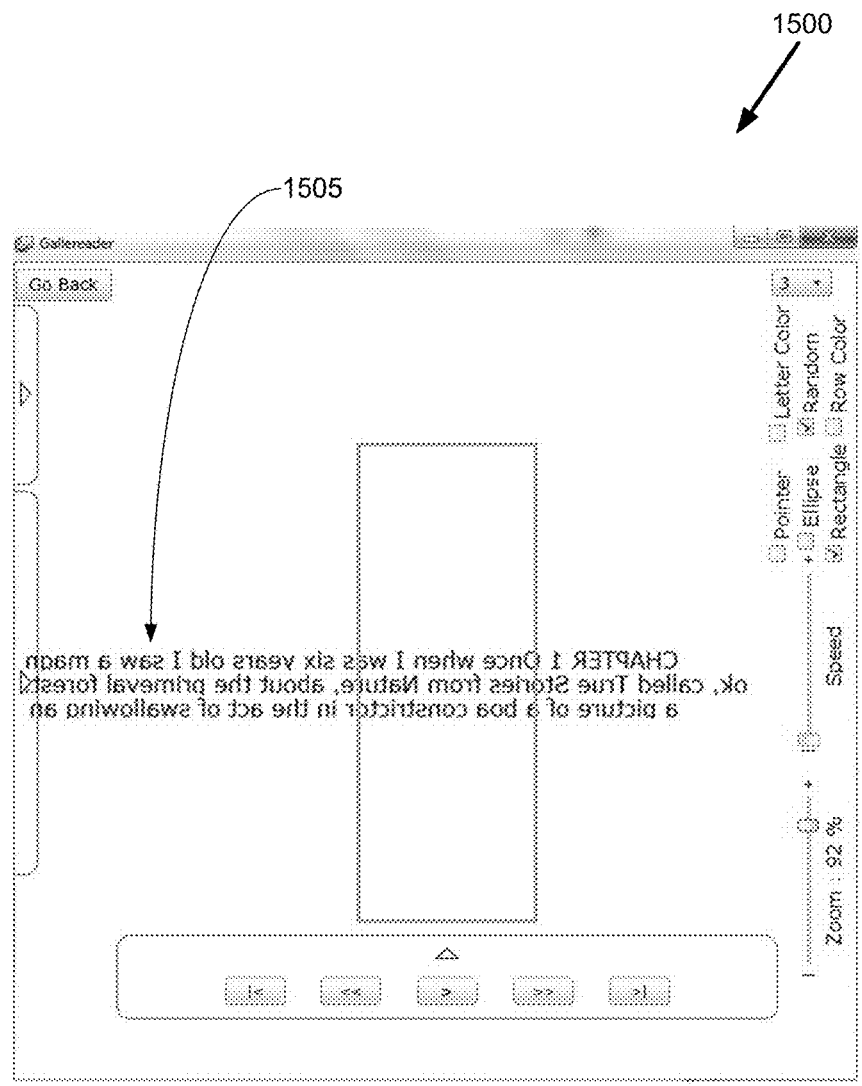
FIG. 15 is a mirror-screen-shot of an ordered scheme used in an embodiment.

The mirror-screen-shot (1500) of FIG. 15 illustrates an apparatus (105) where units are presented in a different perspective, such as in this example being reflected in a mirror. The same characteristics and properties from FIG. 14 may apply to this method. In this example, the motion of the units is from left to right.

Figure 16:
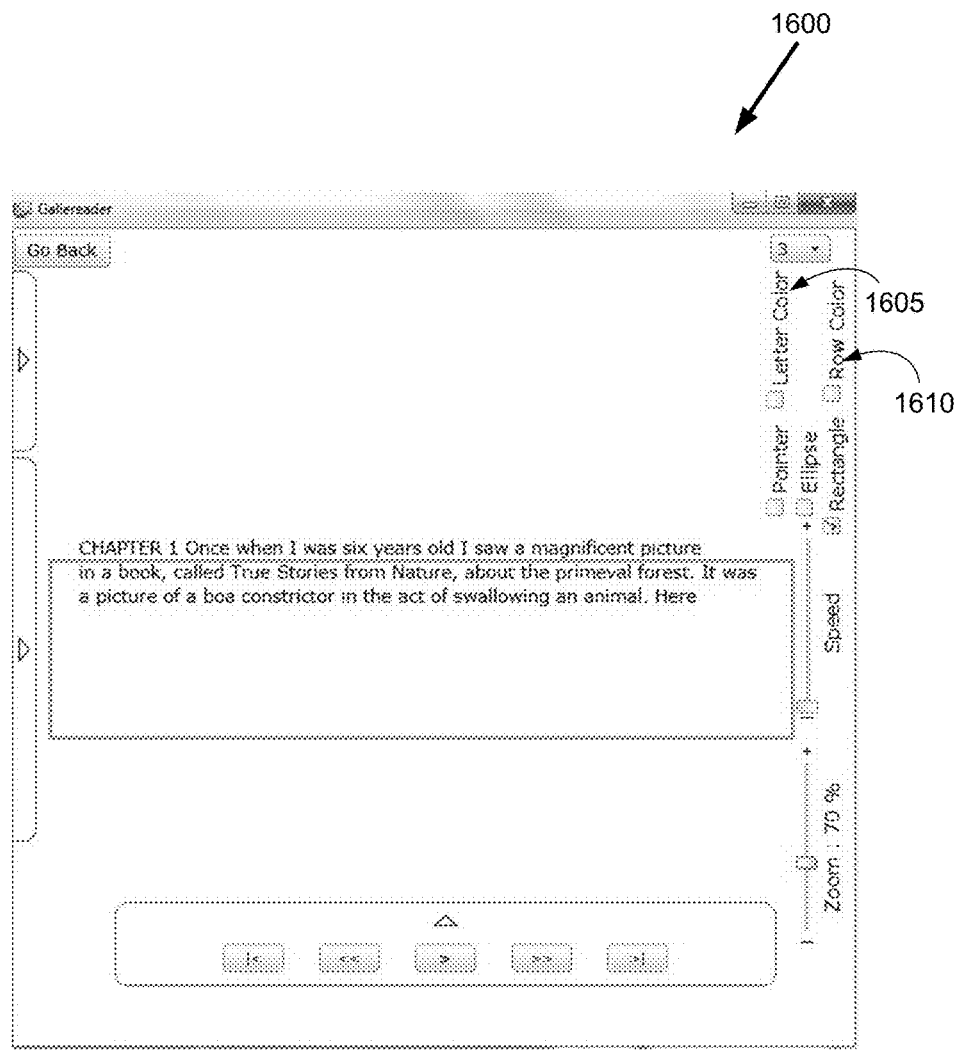
FIG. 16 is a movie-screen-shot of an ordered scheme used in an embodiment.

The movie-screen-shot (1600) of FIG. 16 illustrates an apparatus (105) where controls are present and that are similar to those described for FIG. 14, except that in FIG. 16 the units move vertically, either down from the top or up from the bottom.

Figure 17:
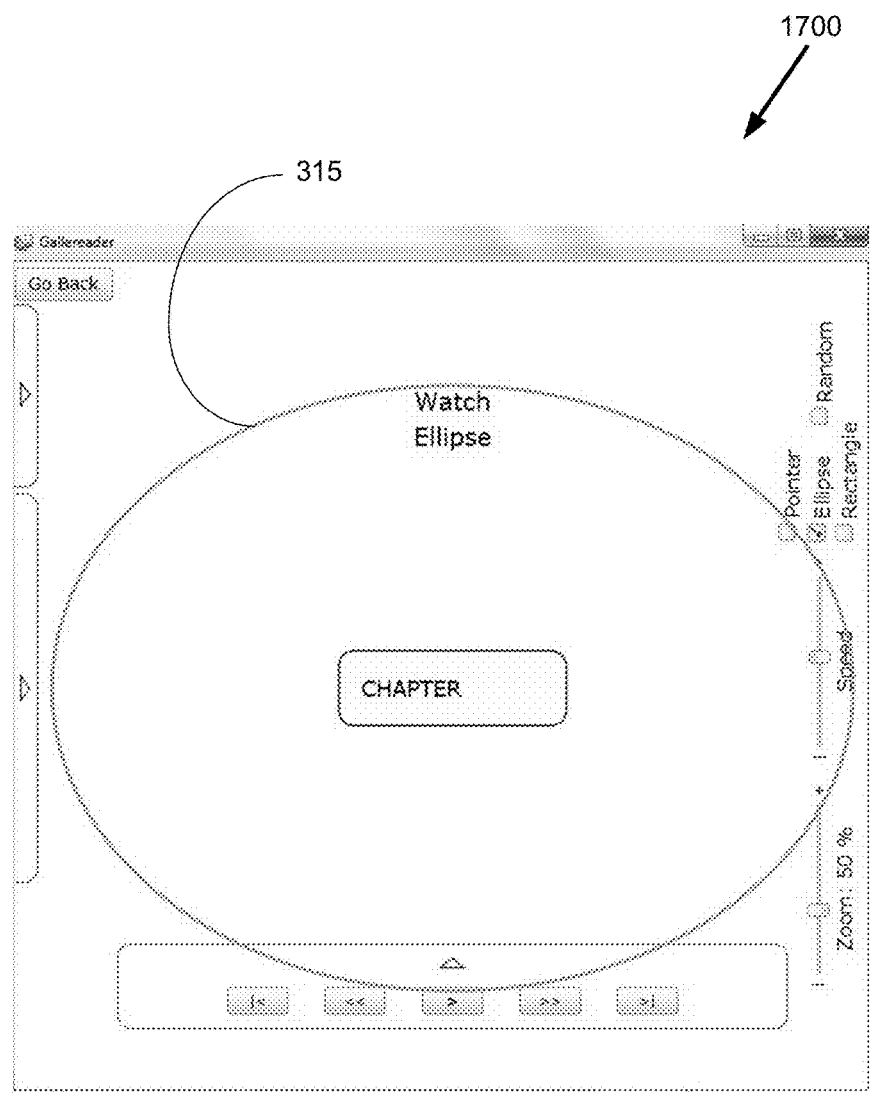
FIG. 17 is a pulse-screen-shot of an ordered scheme used in an embodiment.

The pulse-screen-shot (1700) of FIG. 17 illustrates an apparatus (105) where the screen (106) contains a banner to display units like numbers, letters, words, audio, controls or videos. The apparatus (105) displays each unit (305), one by one regulated by speed, where such speed is the number of units shown in a period of time. The guide (315) offers a way to focus user concentration to capture a wide area of vision.

Figure 18:
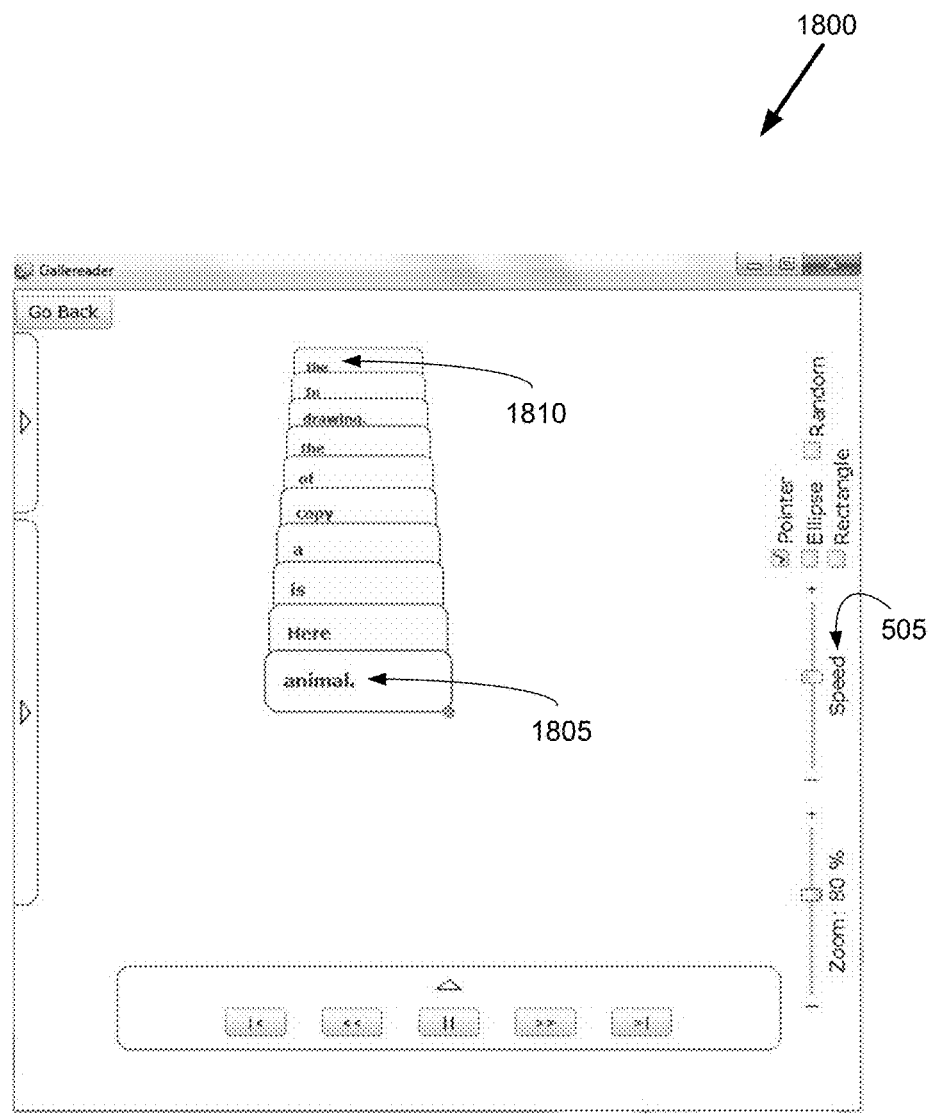
FIG. 18 is a pyramids-screen-shot of an ordered scheme used in an embodiment.

The pyramids-screen-shot (1800) of FIG. 18 illustrates an apparatus (105) that explores the sense of virtual 3-dimensional reading and space allocation. Each unit (305) is displayed from a planar face. A base unit (1805) is the largest with additional units rising atop the base unit (1805) in pyramid fashion. Units above the base unit (1805) sequentially diminish in width and size so that the uppermost unit (1810) simulates a deep distance. A set of elements displayed in pyramid fashion stays visible for a period of time set by the speed control (505). For every set of units, the visual resolution preferably goes from a crisp resolution to blurred units until they fade out and are replaced by the next set of units to repeat the cycle.

Figure 21:
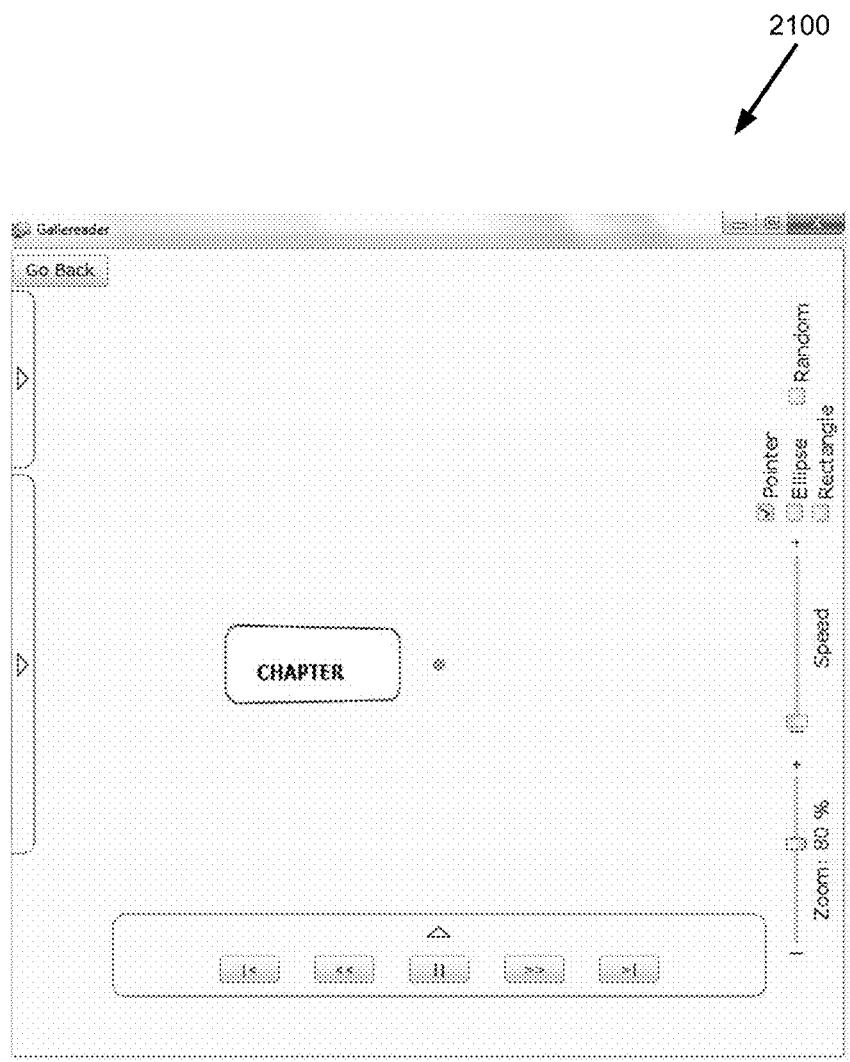
FIG. 21 is a spaceship-screen-shot of an ordered scheme used in an embodiment.

The spaceship-screen-shot (2100) of FIG. 21 illustrates an apparatus (105) simulating the representation of units in a 3-dimensional space. The apparatus (105) originates each unit (305) in a small size so that it appears to be located like at a great distance, then the unit (305) is enlarged in size to simulate its traveling approach to the user. The proportions of size, shape and colors are modified so that the motion of each unit (305) represents either its travel to the user or the user's travel to the unit (305). Random behavior regarding the point of start is also available, as well as the guides and controls for speed, size, and play controls.

Figure 22:
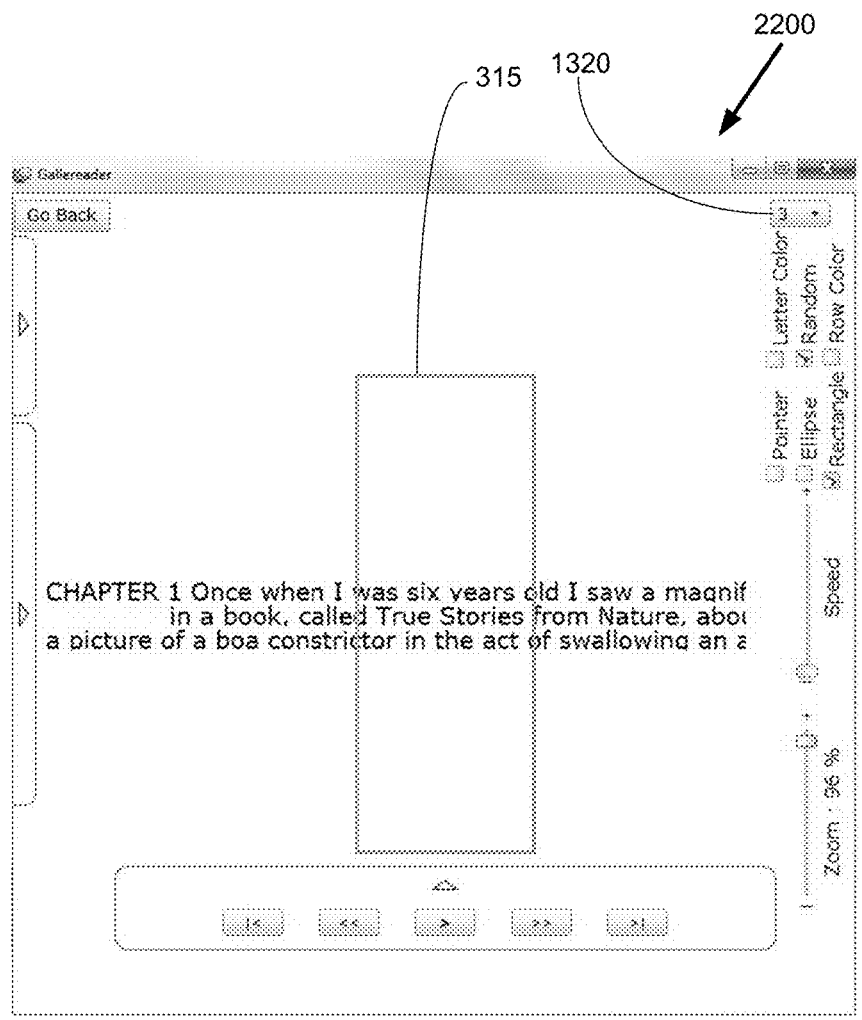
FIG. 22 is a trains-screen-shot of an ordered scheme used in an embodiment.

The trains-screen-shot (2200) of FIG. 22 illustrates an apparatus (105) where moving rows of units pass through an area of vision defined by the guide (315). Each unit (305) may be moved in unison with other units, or any unit (305) may be moved with a speed that is different from another unit. The selector (1320) enables a user selection of the number of rows of units. The units may be any type of object where the characteristics of each unit (305) may be changed from the default setting by the user, such as for example its color, size, shape, speed or content. The motion of the units in this example is horizontal right to left.

Figure 23:
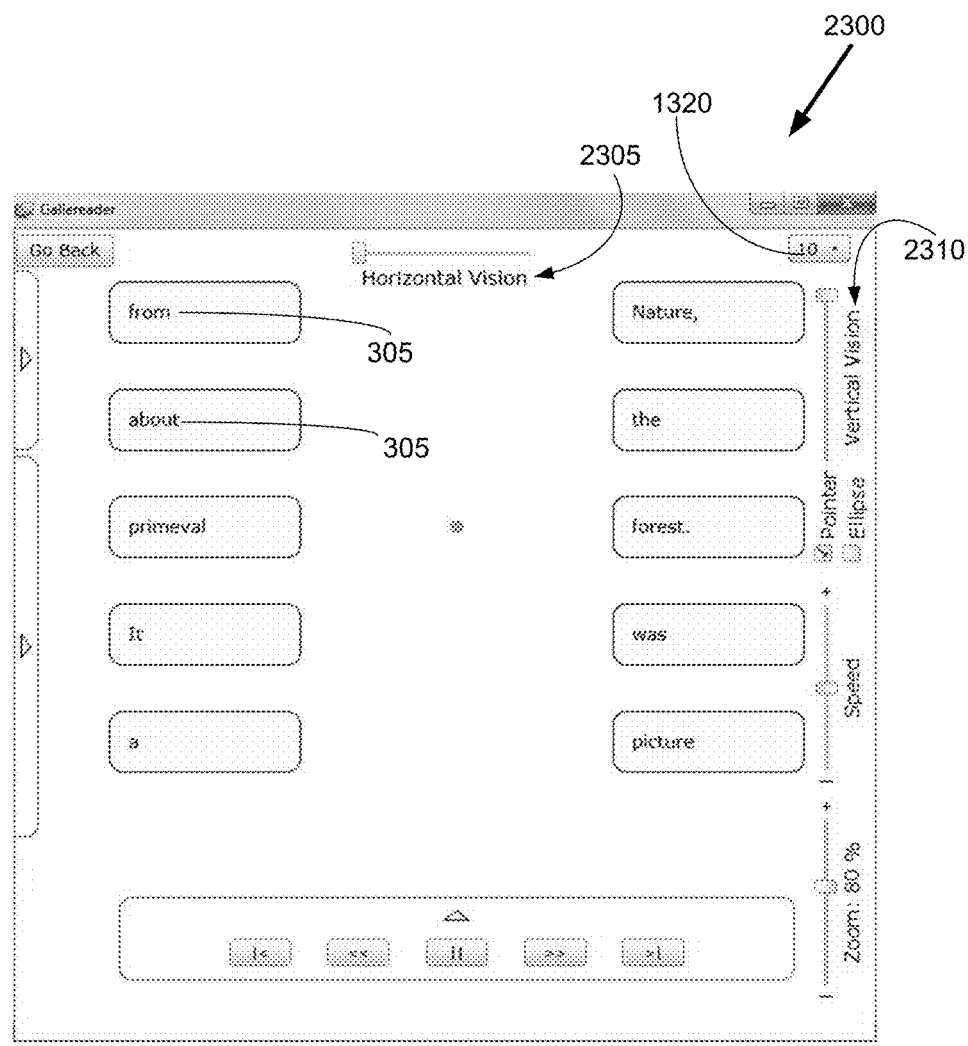
FIG. 23 is a vertical-screen-shot of an ordered scheme used in an embodiment.

The vertical-screen-shot (2300) of FIG. 23 illustrates an apparatus (105) where a set of elements is displayed in order to increase the vertical spacing between each unit (305). A vertical vision (2310) control on the right separates the containers in an up and down direction from the center. A horizontal vision (2305) control opens or shrinks the space between the columns of units. This exemplary reading method encourages the user to enlarge the area of vision in every direction. The order of units may be twisted or rearranged depending on the overlapping setting attributable to vertical and horizontal manipulation. A selector (1320) of the number of units displayed per time is also provided on the right upper corner.

Figure 24:
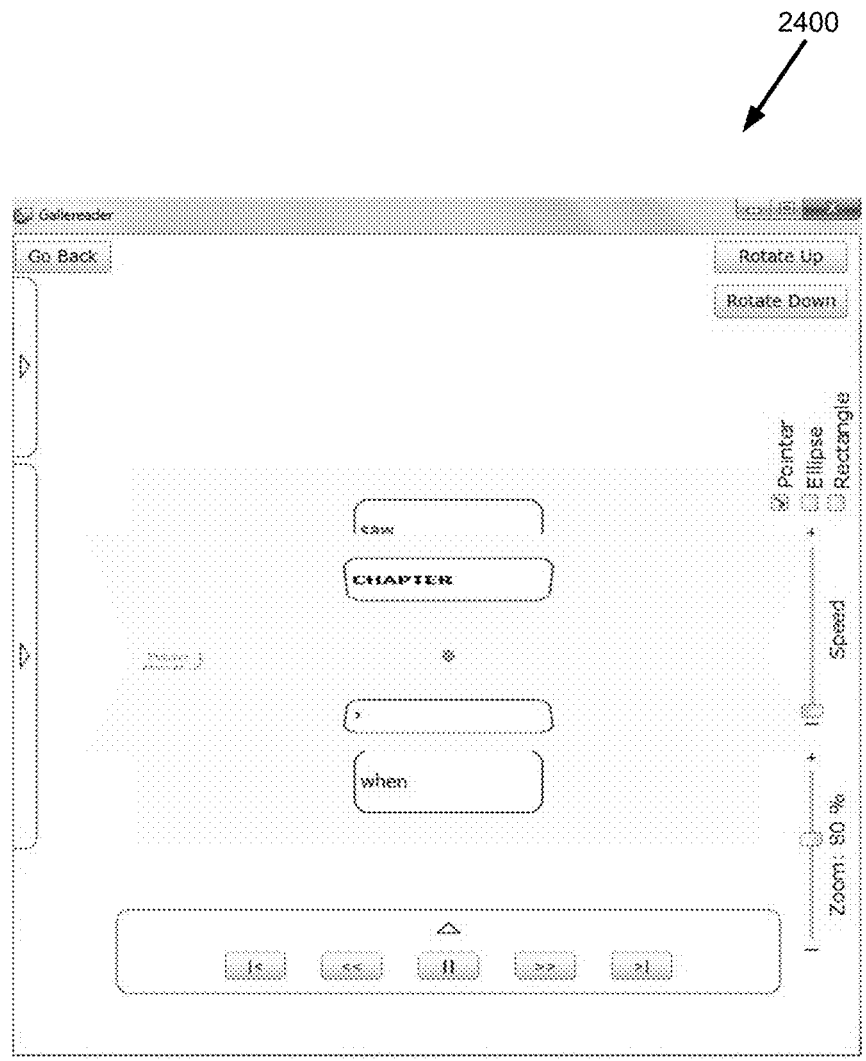
FIG. 24 is a watermill-screen-shot of an ordered scheme used in an embodiment.

The watermill-screen-shot (2400) of FIG. 24 illustrates an apparatus (105) using units that simulate revolving around an axle on a planar surface. Controls are available to control the speed of angular rotation. A set of units is placed over the planar surface which simulate a surface holding the units. The speed of rotation generated by the apparatus (105) or set by the user will display different information. The units acting as independent entities behave in their plane of reference simulating other dimensions like a 3D object on a planar surface.

Figure 25:
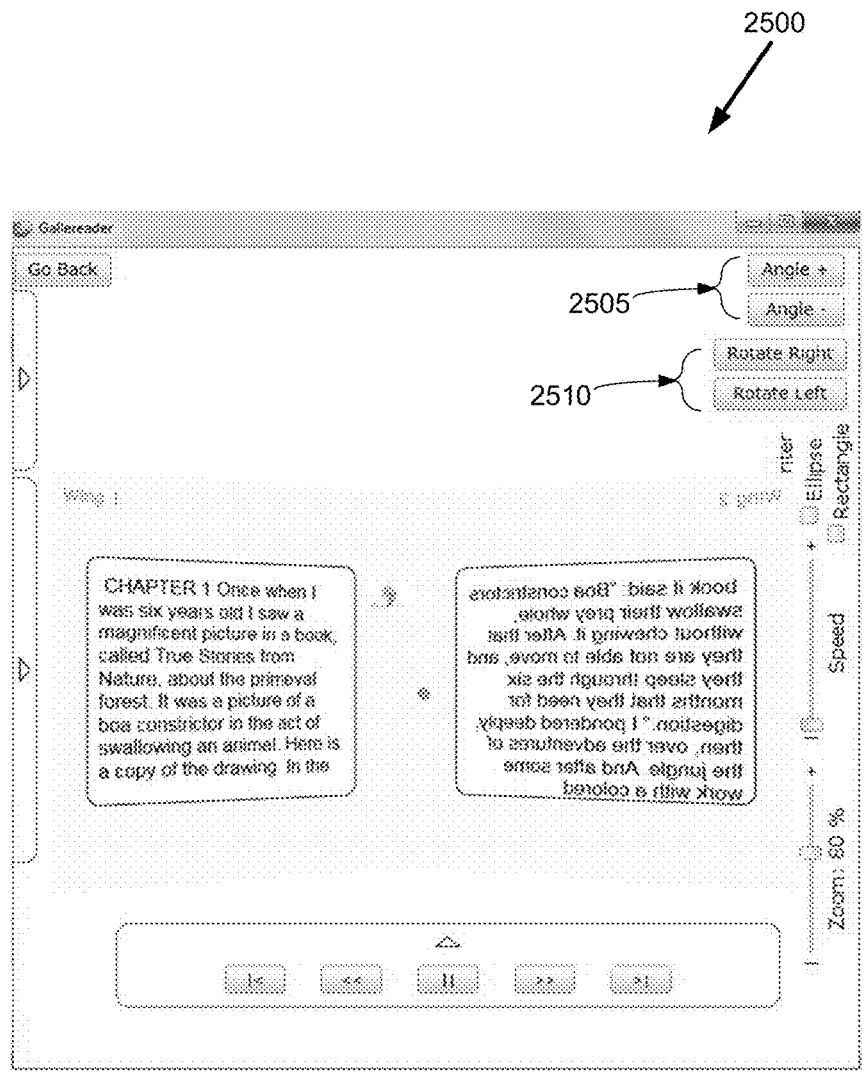
FIG. 25 is a wings-screen-shot of an ordered scheme used in an embodiment.

The wings-screen-shot (2500) of FIG. 25 illustrates an apparatus (105) where the user can explore perspectives. The units are placed on independent planes touching on one of their sides as shown. A default setting or a user selection simulates a rotation of the plane such that it shows a set of units in a normal view which rotates around to show a mirror image view. At least one guide (315) may be selected to explore units. Controls are available for size, the speed of refresh to obtain the next set of units, and the angle of view. The angle controls (2505) preferably affect the angle of presentation of the complete set of units. FIG. 25 provides an exemplary illustration of controls of the rotation of one or more units using rotation controls (2510) shown at the upper right of the wings-screen-shot (2500).

The Moving Step (125) includes moving each unit (305) on the screen (106) according to a control theme, the control theme selected from the group consisting of the speed of motion of one or more units, the acceleration of one or more units, the size of one or more units, the pulsation of one or more units, the rotation of one or more units, the color of one or more units, the shape of one or more units, and the reading direction of one or more units. The control theme is set by default to a particular setting. However, the process optionally includes a step of offering the user a menu to select the control theme.

An exemplary illustration of a control for the pulsation of one or more units is the pulse-screen-shot (1700) of FIG. 17, but because it is a screen shot of a moment in time the actual pulsation is not shown. The pulse-screen-shot (1700) of FIG. 17 displays units like numbers, letters, words, audio, controls or videos. The apparatus (105) displays each unit (305) one by one regulated by speed, for example, such speed is the number of units shown in a period of time. The guide (315) offers a way to encourage the user to concentrate to capture a wide area of vision. The reading-methods-screen-shot (1900) of FIG. 19 shows a menu selection for pulse (1910) to implement the pulsation effect.

An exemplary illustration of a control for the color of one or more units is not readily showable in a black and white context, but it is easily imagined where one line of text is in one color and the next line is in another color. The movie-screen-shot (1600) of FIG. 16 shows a control option for letter-color (1605) and row-color (1610). Many alternative variations of color control will be readily apparent and within the ken of a person of skill in the art.

An exemplary illustration of a control for the reading direction of one or more units is the vertical-screen-shot (2300) of FIG. 23, which shows a slider bar control for horizontal vision (2305) pulled to the left for a minimum setting and a slider bar control for vertical vision (2310) pulled to the top for a maximum setting. This selection minimizes the sequence of words horizontally and orders them in two columns. Each word is a unit (305) and is organized in this fashion. The controls may allow for a single column or many columns, such as the four columns in the jumps-screen-shot (500) of FIG. 5. Similarly, there may be one row or many rows such as the plurality of rows in the jumps-screen-shot (500) of FIG. 5. The horizontal-screen-shot (1400) of FIG. 14 shows two rows and one column.

A second exemplary illustration of reading direction is the mirror-screen-shot (1500) of FIG. 15 showing mirror-image-text (1505) for reverse reading, or reading from right to left with the mirror image of the text.

The Forming Step (130) includes forming a guide (315) on the screen (106) to focus user attention on a unit (305) or set of units.

The guide (315) may be fixed or in motion on the screen (106) with a characteristic choosable by the user, the characteristic selected from the group consisting of transparency percentage, speed of movement, and shape. The guide (315) in FIG. 3 is an ellipse around a set of units and this guide (315) is in a fixed position surrounding the set of units rotating on a virtual Ferris wheel. The jumps-screen-shot (500) of FIG. 5 shows the selection of rectangle (510) for the guide. The virtual-screen-shot (400) of FIG. 4 shows the selection of a pointer (415). The trains-screen-shot (2200) of FIG. 22 shows a guide (315) made of a large vertically-oriented rectangle, reminiscent of looking out of a train car window where the words are moving past it in three lines on the screen (106). The reading-methods-screen-shot (1900) of FIG. 19 shows a check box for a random (1210) display of available guides.

The process optionally includes a step of offering the user a menu to select the guide, also referred to as a guide-menu (320), from the group consisting of a rectangle (510), a triangle, a pointer (415), an ellipse, an object and a symbol. The object is a data construct that provides a description of something that may be used by a computer such as a processor, a peripheral, a document, or a data set. The object preferably defines its status, its method of operation, and how it interacts with other objects. In contrast, a symbol is a thing that represents or stands for something else, especially a material object representing something abstract, such as for example a construct signifying a warning, a logo, a stamp, a brand, etc.

The process optionally includes a Language Control (205), for converting units to another language. This step would be typically available when the units are words, for example in English, and the user desires to view them in another language, for example French. The Language Control (205) would typically be accessed by a menu accessible on the screen by the user. FIG. 20 is a selector-screen-shot (2000) that illustrates a menu control for a language (2005) where the pull-down menu is currently set to select English (2010).

Figure 26:
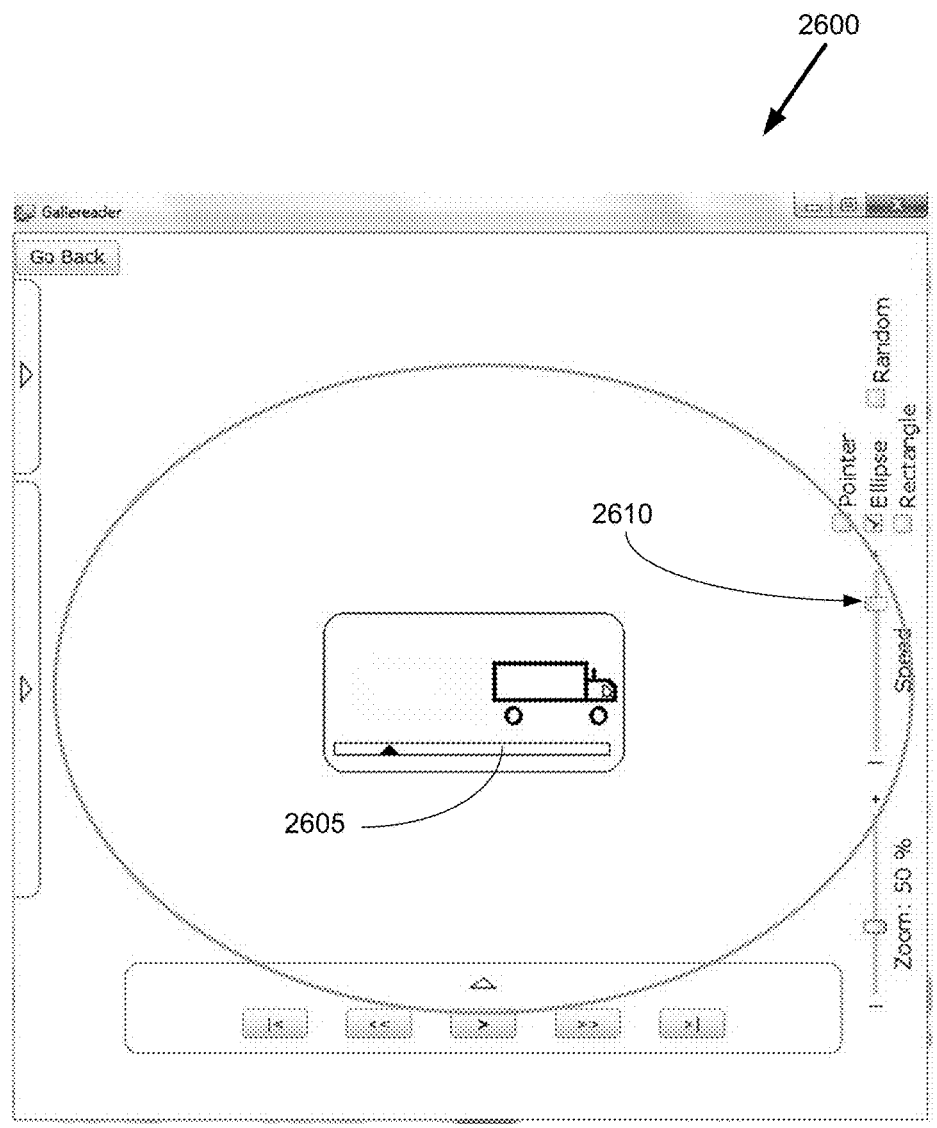
FIG. 26 is a pulse-fast-video-screen-shot of an ordered scheme used in an embodiment.
Figure 27:
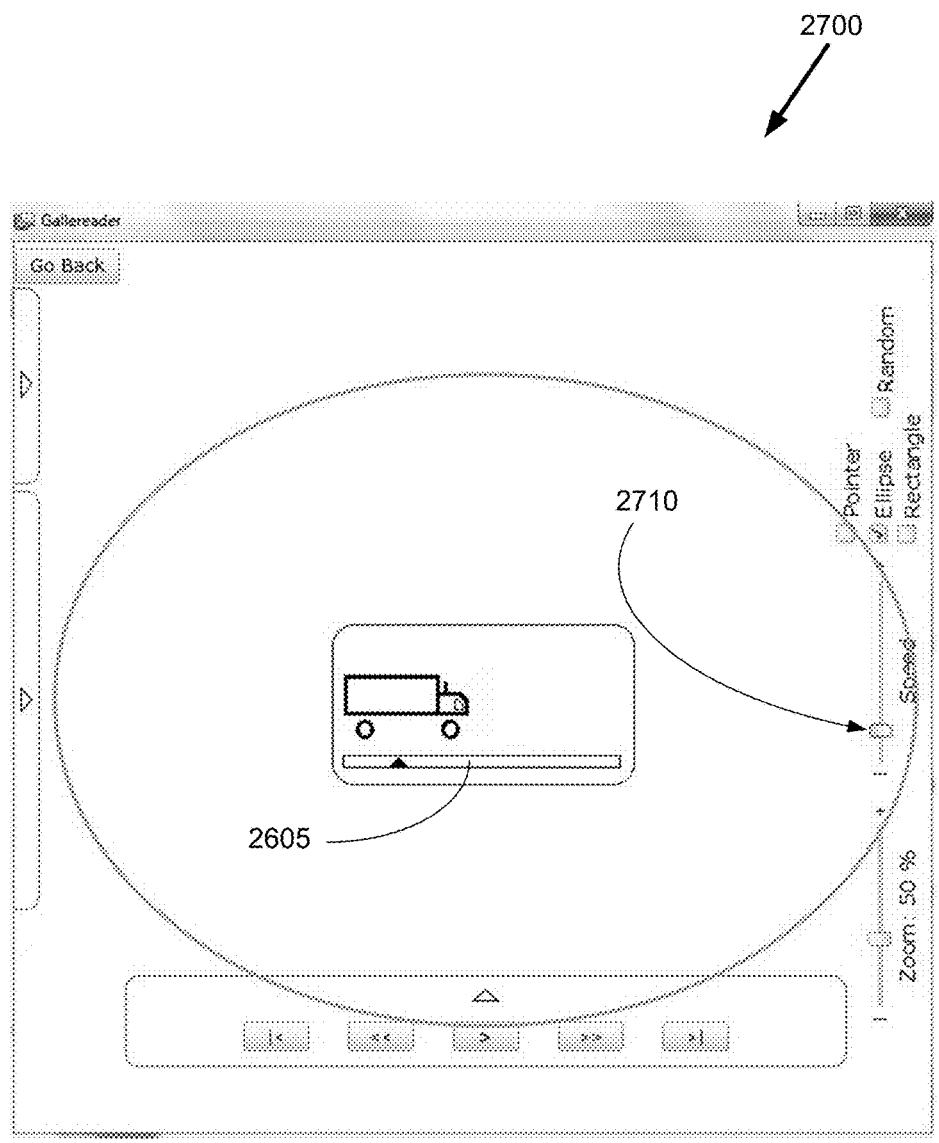
FIG. 27 is a pulse-slow-video-screen-shot of an ordered scheme used in an embodiment.

The process optionally includes a step of offering the user a control to alter the playback speed of a video. An embodiment is illustrated in the pulse-fast-video-screen-shot (2600) of FIG. 26. A time slot (2605) is an indicator of the video time required to play the entire video. A triangular indicator within the time slot (2605) shows where the playback is in the context of the video play length. A fast-speed-setting (2610) is indicated by the position of the indicator on the slide bar near the top of the slide bar for speed. Normal playback speed would typically be set when the indicator for speed is set midway along the slide bar. Another embodiment is illustrated in the pulse-slow-video-screen-shot (2700) of FIG. 27 where a slow-speed-setting (2710), i.e. slow motion, is indicated by the position of the indicator on the slide bar near the bottom of the slide bar for speed.

Figure 28:
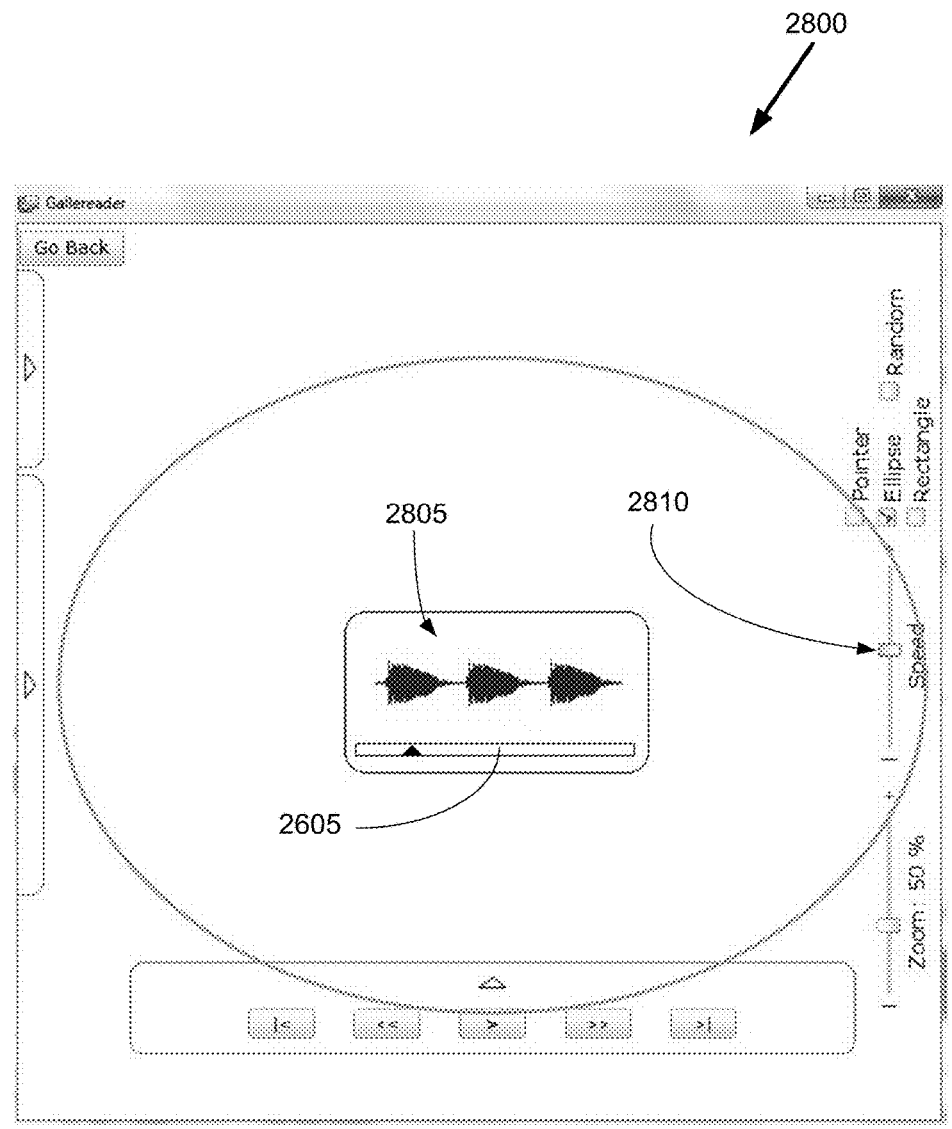
FIG. 28 is a pulse-regular-frequency-screen-shot of an ordered scheme used in an embodiment.
Figure 29:
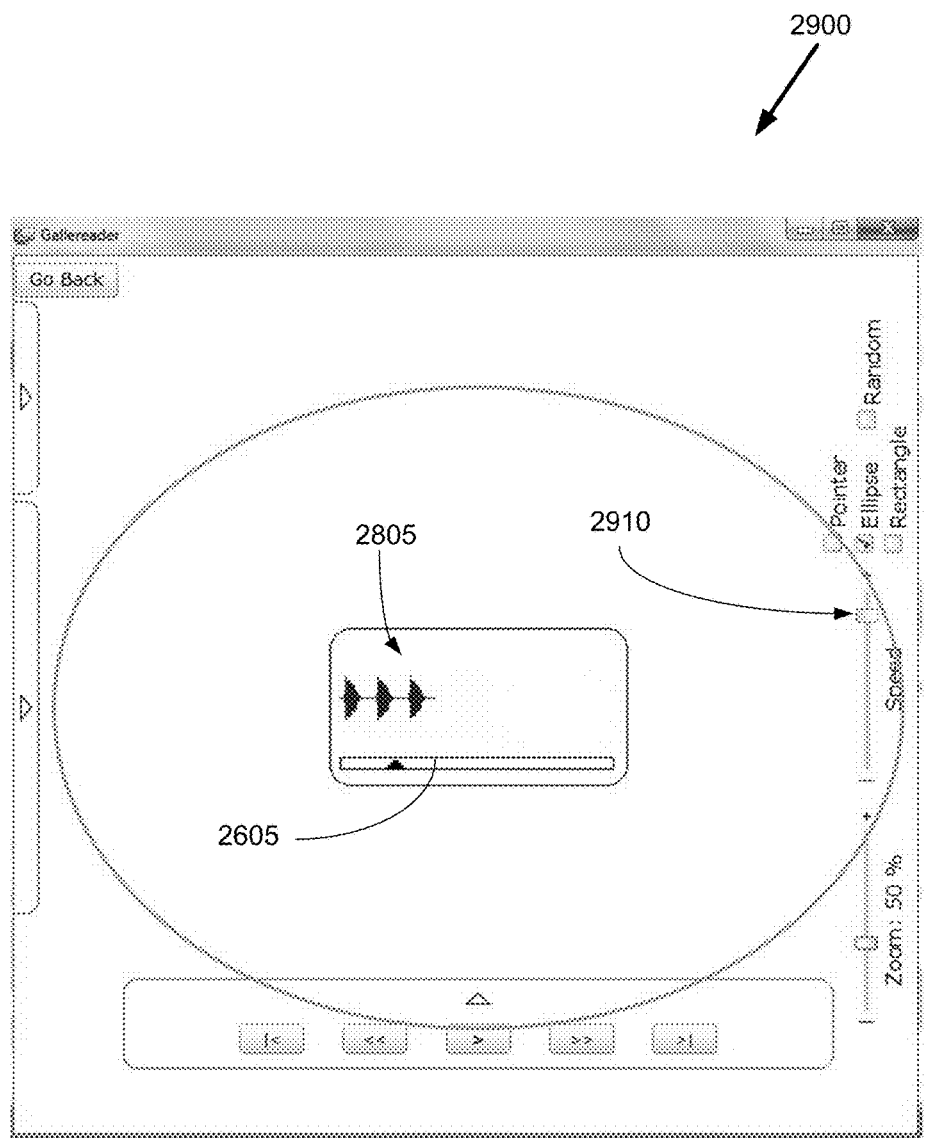
FIG. 29 is a pulse-high-frequency-screen-shot of an ordered scheme used in an embodiment.
Figure 30:
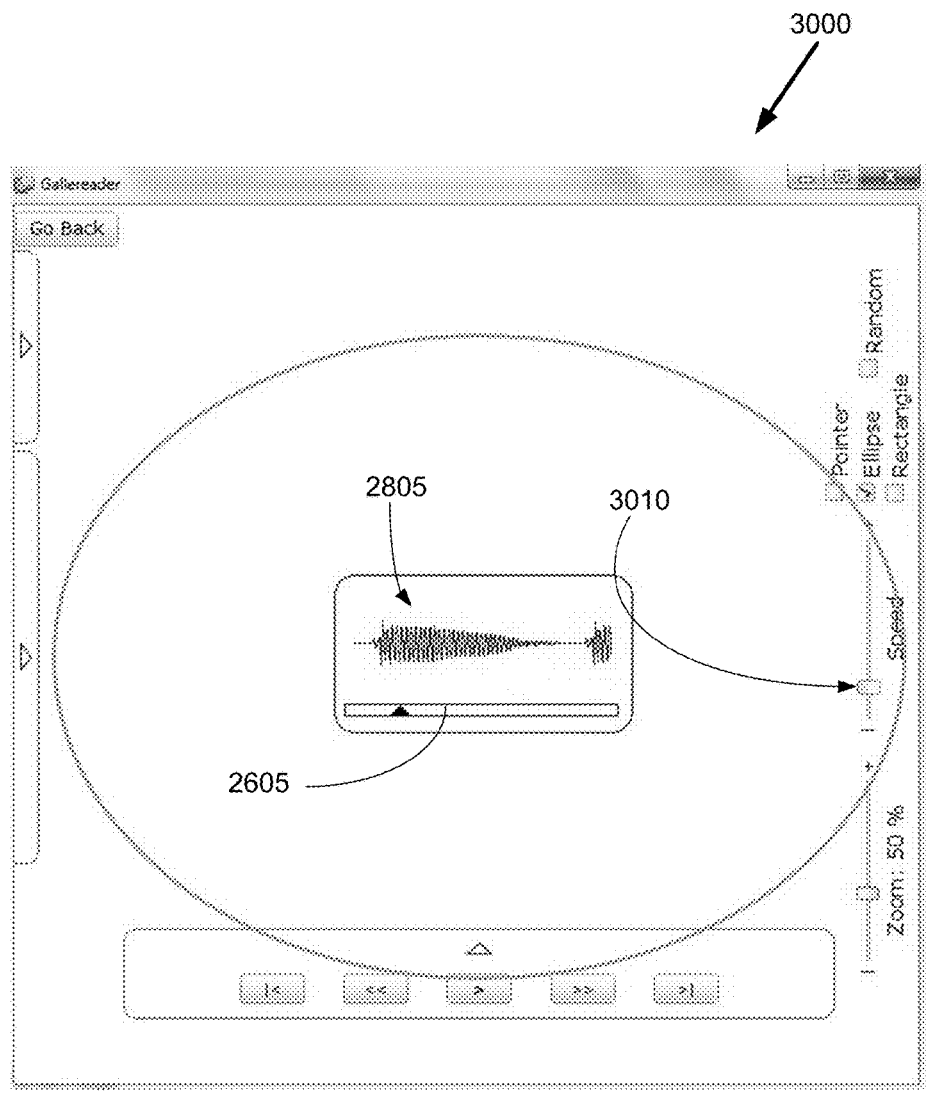
FIG. 30 pulse-low-frequency-screen-shot of an ordered scheme used in an embodiment.

The process optionally includes a step of offering the user a control to alter frequency of a sound, which changes the speed that a sound wave moves past a given point in a given unit of time. An embodiment is illustrated in the pulse-regular-frequency-screen-shot (2800) of FIG. 28. A frequency display (2805) displays a graphic of the sound waves. A time slot (2605) is an indicator of the play position of the sound or audio file in the context of the time required to play the entire sound or audio file. A triangular indicator within the time slot (2605) shows where the playback is in the context of the video play length. A normal-frequency-speed-setting (2810) is indicated by the position of the indicator on the slide bar near the center of the slide bar for speed. Another embodiment is illustrated in the pulse-high-frequency-screen-shot (2900) of FIG. 29 where a high-frequency-speed-setting (2910), i.e. higher sound frequency, is indicated by the position of the indicator on the slide bar for speed near the top of that slide bar. Another embodiment is illustrated in the pulse-low-frequency-screen-shot (3000) of FIG. 30 where a low-frequency-speed-setting (3010), i.e. lower sound frequency, is indicated by the position of the indicator on the slide bar for speed near the bottom of that slide bar.

The process optionally includes a step of offering the user a menu to select the guide (315). This is the guide-menu (320) as illustrated in FIG. 3, showing three choices: a pointer (415), an ellipse and a rectangle (510). Note in FIG. 3 that the ellipse check box is checked and the guide (315) is a large ellipse surrounding a set of units in an ordered scheme where each unit (305) is displayed within a rounded rectangular box (310). In FIG. 4, a virtual-screen-shot (400) shows a selection of a pointer (415), which in this case is a dot (420) which at the time of the screen shot was momentarily located at the center of the screen shot.

The apparatus (105) optionally includes a Controls Component (235) that provide controls (1405) shown in the horizontal-screen-shot (1400) of FIG. 14. These controls (1405) are preferably shown on the screen (106), for example the controls shown are to start, pause, stop, backward and forward. The controls are preferably selected from the group consisting of: timing of starting and stopping the step involving displaying each unit on the screen, reversing display order, fast-forwarding to a unit that would otherwise be displayed at a later time, rewinding to a previously displayed unit, pausing guide and unit movement, aggregating a plurality of units for display, and activating reporting of one or more display dimensions. These controls are preferably provided in a pull-down list on the screen (106). The contents-screen-shot (1000) of FIG. 10 shows a menu for controlling the starting point in the Displaying Step (120).

The apparatus (105) optionally includes a Network Component (240) to the computing device (107). The Network Component (240) enables remote control of the process and supplementation of the material for implementation by the process. An Internet connection is an example of the Network Component (240).

The above-described embodiments including the drawings are examples of the invention and merely provide illustrations of the invention. Other embodiments will be obvious to those skilled in the art. Thus, the scope of the invention is determined by the appended claims and their legal equivalents rather than by the examples given.

What is claimed is:

1. An apparatus for adding dimensionality to material otherwise typically shown in two dimensions and displaying added-dimensionality on a screen of a computing device operated by a user for a purpose of improving speed and area of perception in human comprehension of the material, the apparatus comprising:

a non-transitory computer-readable medium having stored thereon a set of instructions that when executed causes the computing device to implement a process of manipulating the material from two-dimensional format to create and display added-dimensionality material on the screen of the computing device, the process comprising the steps of:

adding the material to the non-transitory computer-readable medium, the material comprising a plurality of units wherein each unit is selected from the group consisting of a letter, a word, an image, a sound, a video, and an object and a symbol;

displaying each unit on the screen of the computing device in an ordered scheme incorporating motion of each unit, a speed of said motion controlled by an on-screen slider bar, the ordered scheme that involves a random pattern of moving each unit on the screen past a guided viewing position, wherein the random pattern includes unit rotation or movement in any 3-dimensional direction: up, down, left, right, into the screen simulated by a reducing size, and out of the screen simulated by increasing size;

moving each unit on the screen according to a control theme, the control theme selected from the group consisting of the speed of motion of one or more units, the acceleration of one or more units, the size of one or more units, the pulsation of one or more units, the rotation of one or more units, the color of one or more units, the shape of one or more units, and the reading direction of one or more units; and forming a guide on the screen to focus user attention on a unit or set of units, the guide having a characteristic choosable by the user, the characteristic selected from the group consisting of transparency percentage, speed of movement, and shape.

2. The apparatus of claim 1, wherein the instructions when executed further causes the computing device to implement a step of converting units to another language.

3. The apparatus of claim 1, wherein the instructions when executed further causes the computing device to implement a step of offering the user a control to alter the playback speed of a video.

4. The apparatus of claim 1, wherein the instructions when executed further causes the computing device to implement a step of offering the user a control to alter frequency of a sound.

5. The apparatus of claim 1, wherein the instructions when executed further causes the computing device to implement a step of offering the user a menu to select the guide.

6. The apparatus of claim 1, wherein the instructions when executed further causes the computing device to implement a step of offering the user a menu to select the control theme.

7. The apparatus of claim 1, wherein the instructions when executed further causes the computing device to implement a step of offering the user a menu to select the guide from the group consisting of a rectangle, a triangle, a pointer, an ellipse, an object and a symbol.

8. The apparatus of claim 1, further comprising controls alterable by the user, the controls selected from the group consisting of: timing of starting and stopping the step involving displaying each unit on the screen, reversing display order, fast-forwarding to a unit that would otherwise be displayed at a later time, rewinding to a previously displayed unit, pausing guide and unit movement, aggregating a plurality of units for display, and activating reporting of one or more display dimensions.

9. The apparatus of claim 1, wherein the instructions when executed further causes the computing device to implement a step of requiring the ordered scheme to include maintaining an enclosure around each unit.

* * * * *